United States Patent
May

(10) Patent No.: US 7,685,891 B2
(45) Date of Patent: *Mar. 30, 2010

(54) MAGNETIC PRINCIPLE BASED TORQUE SENSOR

(75) Inventor: Lutz May, Gelting/Geretsried (DE)

(73) Assignee: NCT Engineering GmbH, Unterhaching (DE)

( * ) Notice: Subject to any disclaimer, the term of this patent is extended or adjusted under 35 U.S.C. 154(b) by 259 days.

This patent is subject to a terminal disclaimer.

(21) Appl. No.: 10/584,880

(22) PCT Filed: Dec. 29, 2004

(86) PCT No.: PCT/EP2004/014796

§ 371 (c)(1),
(2), (4) Date: Jun. 6, 2007

(87) PCT Pub. No.: WO2005/064301

PCT Pub. Date: Jul. 14, 2005

(65) Prior Publication Data
US 2008/0115591 A1 May 22, 2008

(30) Foreign Application Priority Data
Dec. 30, 2003 (EP) .................................. 03030030

(51) Int. Cl.
*G01L 3/02* (2006.01)
(52) U.S. Cl. .............................. 73/862.331; 73/862.333
(58) Field of Classification Search ................................
73/862.331–862.333
See application file for complete search history.

(56) References Cited

U.S. PATENT DOCUMENTS

| 4,471,403 | A | 9/1984 | Dress, Jr. et al. | |
|---|---|---|---|---|
| 4,803,885 | A | 2/1989 | Nonomura et al. | |
| 4,811,609 | A | 3/1989 | Nishibe et al. | |
| 5,301,559 | A | 4/1994 | Tsuji et al. | |
| 5,677,686 | A | 10/1997 | Kachi et al. | |
| 5,887,335 | A | 3/1999 | Garshells | |
| 6,220,105 | B1 * | 4/2001 | Cripe | ...................... 73/862.69 |
| 6,253,460 | B1 | 7/2001 | Schmitz | |
| 6,581,480 | B1 | 6/2003 | May et al. | |
| 6,597,168 | B1 | 7/2003 | Lee | |
| 7,243,557 | B2 * | 7/2007 | May | ...................... 73/862.331 |

(Continued)

FOREIGN PATENT DOCUMENTS

DE          4232040          4/1993

(Continued)

OTHER PUBLICATIONS

Lutz: "Magnetisch Messen", A&D Newsletter; Nov. 2004, pp. 114-117.

*Primary Examiner*—Lisa M Caputo
*Assistant Examiner*—Punam Patel
(74) *Attorney, Agent, or Firm*—Fay Kaplun & Marcin, LLP

(57) ABSTRACT

A torque sensor having a sensor element, wherein the sensor element is manufactured in accordance with the manufacturing steps of applying a first current pulse to the sensor element, wherein the first current pulse is applied such that there is a first current flow in a first direction along a longitudinal axis of the sensor element, wherein the first current pulse is such that the application of the current pulse generates a magnetically encoded region in the sensor element.

44 Claims, 29 Drawing Sheets

U.S. PATENT DOCUMENTS

| | | | |
|---|---|---|---|
| 2002/0100649 A1 | 8/2002 | Agrotis et al. | |
| 2004/0025600 A1 | 2/2004 | Viola et al. | |
| 2008/0116881 A1 * | 5/2008 | May | 324/207.12 |

FOREIGN PATENT DOCUMENTS

| | | |
|---|---|---|
| DE | 29614974 | 1/1997 |
| EP | 1026492 | 4/1981 |
| EP | 1076225 | 2/2001 |
| EP | 1197725 | 4/2002 |
| GB | 2 397 379 | 7/2004 |
| JP | 08271355 | 10/1996 |
| JP | 2004127276 | 4/2004 |
| WO | 95/33982 | 12/1995 |
| WO | 99/56099 | 11/1999 |
| WO | 00/57150 | 9/2000 |
| WO | 01/13081 | 2/2001 |
| WO | 01/20342 | 3/2001 |
| WO | 01/79801 | 10/2001 |
| WO | 02/23146 | 3/2002 |
| WO | 02/42713 | 5/2002 |
| WO | 02/063262 | 8/2002 |

* cited by examiner

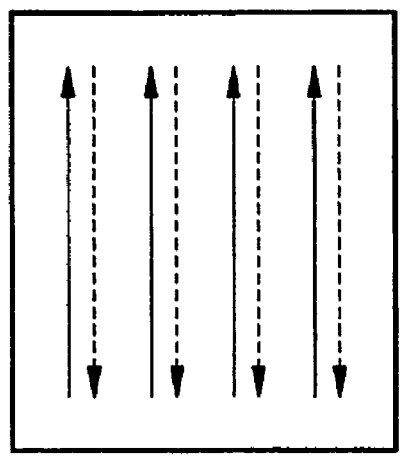 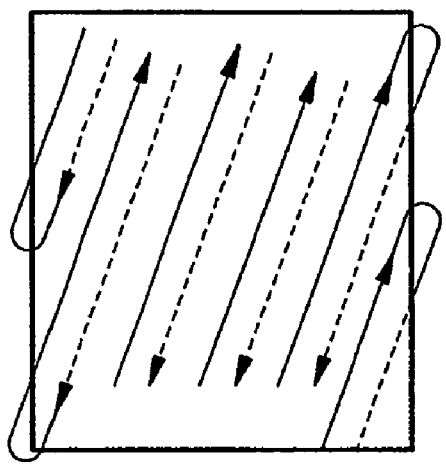
FIG 14
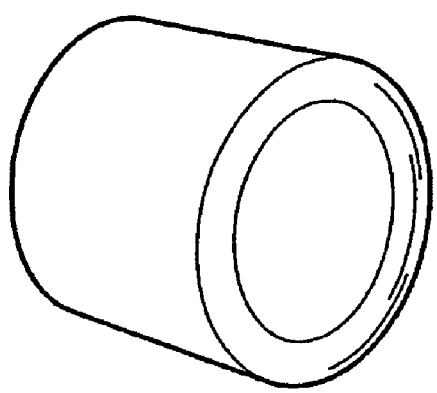 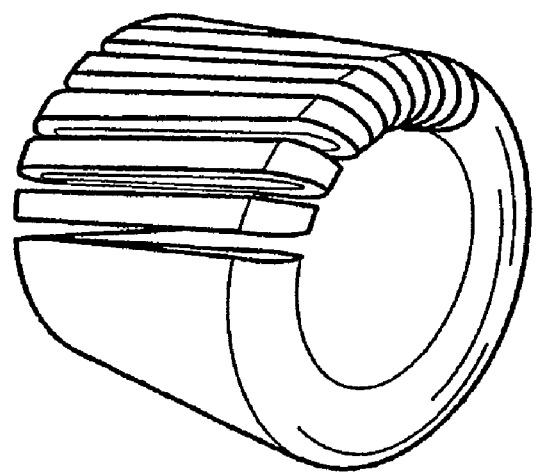
FIG 15  FIG 16

A    B    C    D    E

Externally Measurable Magnetic Field

E

F — Neutral Zone: The effects of the different magnetic field vectors cancel each other Neutrale Zone

G    H

MAGNETIC PRINCIPLE BASED TORQUE SENSOR

The present invention relates to the field of torque measurement. In particular, the present invention relates to a torque sensor manufactured in accordance with a manufacturing method according to an exemplary embodiment of the present invention, to a torque sensor, to a method of magnetically encoding a sensor element for a torque sensor, to a method of magnetizing a metallic body, to a shaft for a magnetic sensor, to a shaft for a torque sensor and to an electrode system for applying current surges for sensor element for a torque sensor.

TECHNOLOGICAL BACKGROUND

U.S. Pat. No. 6,581,480 B1 discloses a torque sensor arrangement comprising a shaft appropriately mounted to have a torque applied at one end portion thereof acting to rotate the shaft upon a longitudinal axis, the shaft having a transducer element comprising an internal portion of the shaft that is magnetized to emanate an external magnetic flux that is a function of a torque applied about that longitudinal axis, the transducer element having axially-spaced end portions defining magnetic pulse of opposite polarity between which the external flux is emanated to have an essentially axial-directed component a location intermediate the end portions, a sensor arrangement comprising first and second sensors located adjacent to the transducer element intermediate the end portion thereof and responsive to the axial-directed component of the magnetic flux emanated thereby, the first and second sensors being disposed adjacent radially opposite sides of the elongated member with respect to the longitudinal axis and signal processing means to which the first and second sensors are connected in an additive manner to develop an output signal representing the torque about the longitudinal axis.

WO 02/063262 A1 discloses a longitudinally magnetized transducer element. A region of a shaft may be given a permanent or stored longitudinal magnetization by locating it within a helical coil and rotating the shaft about its axis. When applying a pulse of direct current to the helical coil to magnetize at least an annular zone of the shaft. Successive pulses of opposite polarity are preferably employed, the first of higher magnitude saturating the shaft to greater depths, the second of lower magnitude to saturate the shaft to lesser depths. This provides outer and inner annuli of opposite polarity magnetization. The coil may be energized with alternating current while the shaft is moved axially through it in a pre-magnetization procedure to magnetically cleans or degauss the shaft. The coil may be energized subsequent to magnetization with alternating current at a lower magnitude and/or higher frequency than for pre-magnetization without the post-magnetization fields destroying the desired pattern of magnetization.

WO 99/56099 discloses a magnetizing arrangement for torque/force sensors. A magnet or elastic transducer for sensing a torque in a shaft is formed by circumferentially magnetizing a magnetisable integral portion of the shaft. To assist in the emanation of a flux dependent torque, the transducer element portion of the shaft may have further circumferentially magnetized portions to each side. These further portions are of opposite polarity magnetization to that of the transducer element. The external magnetic flux emanated by the transducer is a function of torque and is detectable by a magnetic field sensor. An alternative means for the same purpose is to provide the transducer element at a portion of the shaft having an integral annular section of raised profile projecting beyond the adjoining portions of the shaft. The shaft may be provided with a series of circumferentially magnetized portions of alternating polarity. A shaft having the whole or an integral portion of it magnetized, it can also be used to provide a force transducer sensitive to bending moment induced in the shaft by a force to be measured.

SUMMARY OF THE PRESENT INVENTION

The present invention relates to torque or force sensors, to individual elements of these sensors, to a torque sensor manufactured according with a manufacturing method according to an exemplary embodiment of the present invention, to a shaft for a torque sensor, to a method of magnetically encoding a sensor element for a torque sensor and to an electrode system for applying current surges to a sensor element of a torque sensor.

In accordance with an exemplary embodiment of the present invention, a sensor element of a torque sensor is manufactured in a way that a current pulse is applied to the sensor element. The current pulse is applied such that a magnetically encoded region is generated in the sensor element. The current pulse is applied such that there is a current flow in a direction essentially along a longitudinal axis of the sensor element.

According to another exemplary embodiment of the present invention, after applying a first current pulse to the sensor element for causing a first current flow in a first direction, a second current flow may be caused by a second current pulse having a direction opposite to the first current flow. By applying the first and second current pulses, it is believed that a magnetic flow distribution is achieved in the sensor element such that in a direction perpendicular to a surface of the sensor element that is firstly a flow in a first direction and then secondly a flow in a second direction opposite to the first direction.

The above and other aspects, exemplary embodiments, features and what is believed to be advantageous of the present invention will become apparent from the following description and the appendant claims, taking in conjunction with the component drawings in which like parts or elements are denoted by like reference numbers.

BRIEF DESCRIPTION OF THE DRAWINGS

The accompanying drawings which are included to provide a further understanding of the invention in constitute a part of the specification illustrate exemplary embodiments of the present invention. However, those drawings are not provided for restricting a scope of the invention to the explicit embodiments depicted in the figures.

FIG. 2b shows a cross-sectional view along AA' of FIG. 2a.

FIG. 3b shows a cross-sectional representation along BB' of FIG. 3a.

FIG. 10b shows the sensor element of FIG. 10a after the application of current surges by means of the electrode system of FIG. 10a.

FIG. 14 shows another schematic diagram for illustrating that when no mechanical stress is applied to the sensor element according to an exemplary embodiment of the present invention, magnetic flux lines are running in its original paths.

FIG. 15 is another schematic diagram for further explaining a principle of an exemplary embodiment of the present invention.

FIG. 16 is another schematic diagram for further explaining the principle of an exemplary embodiment of the present invention.

Figure 1:
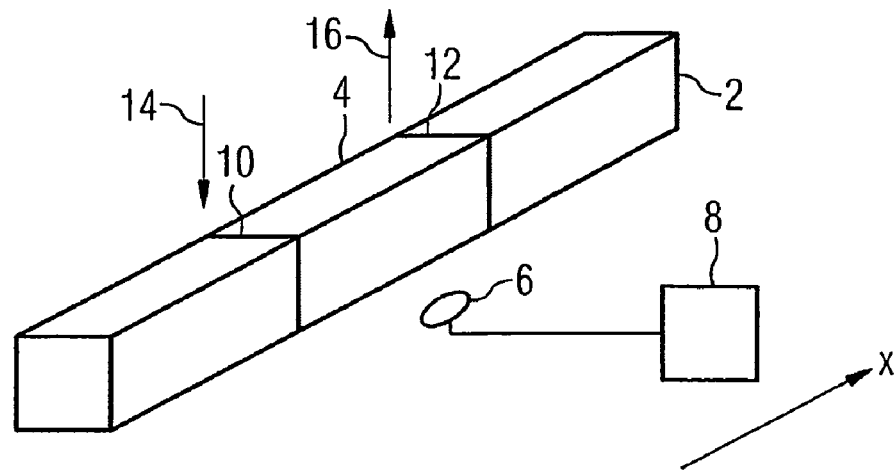
FIG. 1 shows a torque sensor with a sensor element according to an exemplary embodiment of the present invention for explaining a method of manufacturing a torque sensor according to an exemplary embodiment of the present invention.

The present invention relates to a sensor having a sensor element such as a shaft wherein the sensor element is manufactured in accordance with the following manufacturing steps applying a first current pulse to the sensor element;
wherein the first current pulse is applied such that there is a first current flow in a first direction along a longitudinal axis of the sensor element;
wherein the first current pulse is such that the application of the current pulse generates a magnetically encoded region in the sensor element.

According to another exemplary embodiment of the present invention, a further second current pulse is applied to the sensor element. The second current pulse is applied such that there is a second current flow in a direction along the longitudinal axis of the sensor element.

According to another exemplary embodiment of the present invention, the directions of the first and second current pulses are opposite to each other. Also, according to further exemplary embodiments of the present invention, each of the first and second current pulses has a raising edge and a falling edge. Preferably, the raising edge is steeper than the falling edge.

It is believed that the application of a current pulse according to an exemplary embodiment of the present invention may cause a magnetic field structure in the sensor element such that in a cross-sectional view of the sensor element, there is a first circular magnetic flow having a first direction and a second magnetic flow having a second direction. The radius of the first magnetic flow is larger than the radius of the second magnetic flow. In shafts having a non-circular cross-section, the magnetic flow is not necessarily circular but may have a form essentially corresponding to and being adapted to the cross-section of the respective sensor element.

It is believed that if no torque is applied to a sensor element encoded in accordance with the exemplary embodiment of the present invention, there is no magnetic field or essentially no magnetic field detectable at the outside. When a torque or force is applied to the sensor element, there is a magnetic field emanated from the sensor element which can be detected by means of suitable coils. This will be described in further detail in the following.

A torque sensor according to an exemplary embodiment of the present invention has a circumferential surface surrounding a core region of the sensor element. The first current pulse is introduced into the sensor element at a first location at the circumferential surface such that there is a first current flow in the first direction in the core region of the sensor element. The first current pulse is discharged from the sensor element at a second location at the circumferential surface. The second location is at a distance in the first direction from the first location. The second current pulse, according to an exemplary embodiment of the present invention may be introduced into the sensor element at the second location or adjacent to the second location at the circumferential surface such that there is the second current flow in the second direction in the core region or adjacent to the core region in the sensor element. The second current pulse may be discharged from the sensor element at the first location or adjacent to the first location at the circumferential surface.

As already indicated above, according to an exemplary embodiment of the present invention, the sensor element may be a shaft. The core region of such shaft may extend inside the shaft along its longitudinal extension such that the core region surrounds a center of the shaft. The circumferential surface of the shaft is the outside surface of the shaft. The first and second locations are respective circumferential regions at the outside of the shaft. There may be a limited number of contact portions which constitute such regions. Preferably, real contact regions may be provided, for example, by providing electrode regions made of brass rings as electrodes. Also, a core of a conductor may be looped around the shaft to provide for a good electric contact between a conductor such as a cable without isolation and the shaft.

According to an exemplary embodiment of the present invention, the first current pulse and preferably also the second current pulse are not applied to the sensor element at an end face of the sensor element. The first current pulse may have a maximum between 40 and 1400 Ampere or between 60 and 800 Ampere or between 75 and 600 Ampere or between 80 and 500 Ampere. The current pulse may have a maximum such that an appropriate encoding is caused to the sensor element. However, due to different materials which may be used and different forms of the sensor element and different dimensions of the sensor element, a maximum of the current pulse may be adjusted in accordance with these parameters. The second pulse may have a similar maximum or may have a maximum approximately 10, 20, 30, 40 or 50% smaller than the first maximum. However, the second pulse may also have a higher maximum such as 10, 20, 40, 50, 60 or 80% higher than the first maximum.

A duration of those pulses may be the same. However, it is possible that the first pulse has a significant longer duration than the second pulse. However, it is also possible that the second pulse has a longer duration than the first pulse.

The first and/or second current pulses have a first duration from the start of the pulse to the maximum and have a second duration from the maximum to essentially the end of the pulse. According to an exemplary embodiment of the present invention, the first duration is significantly longer than the second duration. For example, the first duration may be smaller than 300 ms wherein the second duration is larger than 300 ms. However, it is also possible that the first duration is smaller than 200 ms whereas the second duration is larger than 400 ms. Also, the first duration according to another exemplary embodiment of the present invention may be between 20 to 150 ms wherein the second duration may be between 180 to 700 ms.

As already indicated above, it is possible to apply a plurality of first current pulses but also a plurality of second current pulses. The sensor element may be made of steel whereas the steel may comprise nickel. The sensor material used for the primary sensor or for the sensor element may be 50NiCr13 or X4CrNi13-4 or X5CrNiCuNb16-4 or X20CrNi17-4 or X46Cr13 or X20Cr13 or 14NiCr14 or S155 as set forth in DIN 1.2721 or 1.4313 or 1.4542 or 1.2787 or 1.4034 or 1.4021 or 1.5752 or 1.6928.

The first current pulse may be applied by means of an electrode system having at least a first electrode and a second electrode. The first electrode is located at the first location or adjacent to the first location and the second electrode is located at the second location or adjacent to the second location.

According to an exemplary embodiment of the present invention, each of the first and second electrodes has a plurality of electrode pins. The plurality of electrode pins of each of the first and second electrodes may be arranged circumferentially around the sensor element such that the sensor element is contacted by the electrode pins of the first and second electrodes at a plurality of contact points at an outer circumferential surface of the shaft at the first and second locations.

As indicated above, instead of electrode pins laminar or two-dimensional electrode surfaces may be applied. Preferably, electrode surfaces are adapted to surfaces of the shaft such that a good contact between the electrodes and the shaft material may be ensured.

According to another exemplary embodiment of the present invention, at least one of the first current pulse and at least one of the second current pulse are applied to the sensor element such that the sensor element has a magnetically encoded region such that in a direction essentially perpendicular to a surface of the sensor element, the magnetically encoded region of the sensor element has a magnetic field structure such that there is a first magnetic flow in a first direction and a second magnetic flow in a second direction.

According to another exemplary embodiment of the present invention, the first direction is opposite to the second direction.

According to a further exemplary embodiment of the present invention, in a cross-sectional view of the sensor element, there is a first circular magnetic flow having the first direction and a first radius and a second circular magnetic flow having the second direction and a second radius. The first radius may be larger than the second radius.

Furthermore, according to another exemplary embodiment of the present invention, the sensor elements may have a first pinning zone adjacent to the first location and a second pinning zone adjacent to the second location.

The pinning zones may be manufactured in accordance with the following manufacturing method according to an exemplary embodiment of the present invention. According to this method, for forming the first pinning zone, at the first location or adjacent to the first location, a third current pulse is applied on the circumferential surface of the sensor element such that there is a third current flow in the second direction. The third current flow is discharged from the sensor element at a third location which is displaced from the first location in the second direction.

According to another exemplary embodiment of the present invention, for forming the second pinning zone, at the second location or adjacent to the second location, a forth current pulse is applied on the circumferential surface to the sensor element such that there is a forth current flow in the first direction. The forth current flow is discharged at a forth location which is displaced from the second location in the first direction.

According to another exemplary embodiment of the present invention, a torque sensor is provided comprising a first sensor element with a magnetically encoded region wherein the first sensor element has a surface. According to the present invention, in a direction essentially perpendicular to the surface of the first sensor element, the magnetically encoded region of the first sensor element has a magnetic field structure such that there is a first magnetic flow in a first direction and a second magnetic flow in a second direction. The first and second directions may be opposite to each other.

According to another exemplary embodiment of the present invention, the torque sensor may further comprise a second sensor element with at least one magnetic field detector. The second sensor element is adapted for detecting variations in the magnetically encoded region. More precisely, the second sensor element is adapted for detecting variations in a magnetic field emitted from the magnetically encoded region of the first sensor element.

According to another exemplary embodiment of the present invention, the magnetically encoded region extends longitudinally along a section of the first sensor element, but does not extend from one end face of the first sensor element to the other end face of the first sensor element. In other words, the magnetically encoded region does not extend along all of the first sensor element but only along a section thereof.

According to another exemplary embodiment of the present invention, the first sensor element has variations in the material of the first sensor element caused by at least one current pulse or surge applied to the first sensor element for altering the magnetically encoded region or for generating the magnetically encoded region. Such variations in the material may be caused, for example, by differing contact resistances between electrode systems for applying the current pulses and the surface of the respective sensor element. Such variations may, for example, be burn marks or color variations or signs of an annealing.

According to another exemplary embodiment of the present invention, the variations are at an outer surface of the sensor element and not at the end faces of the first sensor element since the current pulses are applied to outer surface of the sensor element but not to the end faces thereof.

According to another exemplary embodiment of the present invention, a shaft for a magnetic sensor is provided having, in a cross-section thereof, at least two circular magnetic loops running in opposite direction. According to another exemplary embodiment of the present invention, such shaft is believed to be manufactured in accordance with the above-described manufacturing method.

Furthermore, a shaft may be provided having at least two circular magnetic loops which are arranged concentrically.

According to another exemplary embodiment of the present invention, a shaft for a torque sensor may be provided which is manufactured in accordance with the following manufacturing steps where firstly a first current pulse is applied to the shaft. The first current pulse is applied to the shaft such that there is a first current flow in a first direction along a longitudinal axis of the shaft. The first current pulse is such that the application of the current pulse generates a magnetically encoded region in the shaft. This may be made by using an electrode system as described above and by applying current pulses as described above.

According to another exemplary embodiment of the present invention, an electrode system may be provided for applying current surges to a sensor element for a torque sensor, the electrode system having at least a first electrode and a second electrode wherein the first electrode is adapted for location at a first location on an outer surface of the sensor element. A second electrode is adapted for location at a second location on the outer surface of the sensor element. The first and second electrodes are adapted for applying and discharging at least one current pulse at the first and second locations such that current flows within a core region of the sensor element are caused. The at least one current pulse is such that a magnetically encoded region is generated at a section of the sensor element.

According to an exemplary embodiment of the present invention, the electrode system comprises at least two groups of electrodes, each comprising a plurality of electrode pins. The electrode pins of each electrode are arranged in a circle such that the sensor element is contacted by the electrode pins of the electrode at a plurality of contact points at an outer surface of the sensor element.

The outer surface of the sensor element does not include the end faces of the sensor element.

FIG. 1 shows an exemplary embodiment of a torque sensor according to the present invention. The torque sensor comprises a first sensor element or shaft 2 having a rectangular cross-section. The first sensor element 2 extends essentially along the direction indicated with X. In a middle portion of the first sensor element 2, there is the encoded region 4. The first location is indicated by reference numeral 10 and indicates one end of the encoded region and the second location is indicated by reference numeral 12 which indicates another end of the encoded region or the region to be magnetically encoded 4. Arrows 14 and 16 indicate the application of a current pulse. As indicated in FIG. 1, a first current pulse is applied to the first sensor element 2 at an outer region adjacent or close to the first location 10. Preferably, as will be described in further detail later on, the current is introduced into the first sensor element 2 at a plurality of points or regions close to the first location and preferably surrounding the outer surface of the first sensor element 2 along the first location 10. As indicated with arrow 16, the current pulse is discharged from the first sensor element 2 close or adjacent or at the second location 12 preferably at a plurality or locations along the end of the region 4 to be encoded. As already indicated before, a plurality of current pulses may be applied in succession they may have alternating directions from location 10 to location 12 or from location 12 to location 10.

Reference numeral 6 indicates a second sensor element which is preferably a coil connected to a controller electronic 8. The controller electronic 8 may be adapted to further process a signal output by the second sensor element 6 such that an output signal may output from the control circuit corresponding to a torque applied to the first sensor element 2. The control circuit 8 may be an analog or digital circuit. The second sensor element 6 is adapted to detect a magnetic field emitted by the encoded region 4 of the first sensor element.

It is believed that, as already indicated above, if there is no stress or force applied to the first sensor element 2, there is essentially no field detected by the second sensor element 6. However, in case a stress or a force is applied to the secondary sensor element 2, there is a variation in the magnetic field emitted by the encoded region such that an increase of a magnetic field from the presence of almost no field is detected by the second sensor element 6.

It has to be noted that according to other exemplary embodiments of the present invention, even if there is no stress applied to the first sensor element, it may be possible that there is a magnetic field detectable outside or adjacent to the encoded region 4 of the first sensor element 2. However, it is to be noted that a stress applied to the first sensor element 2 causes a variation of the magnetic field emitted by the encoded region 4.

In the following, with reference to FIGS. 2a, 2b, 3a, 3b and 4, a method of manufacturing a torque sensor according to an exemplary embodiment of the present invention will be described. In particular, the method relates to the magnetization of the magnetically encoded region 4 of the first sensor element 2.

Figure 2A:
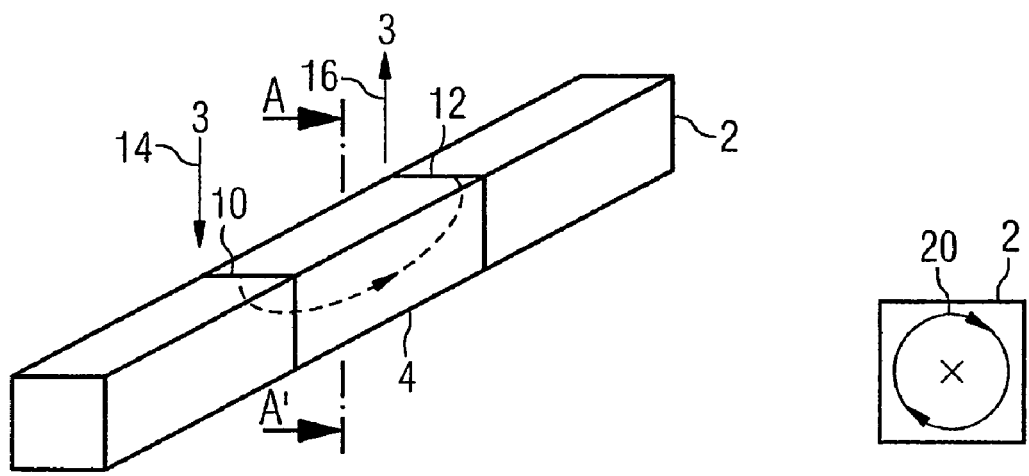
FIG. 2a shows an exemplary embodiment of a sensor element of a torque sensor according to the present invention for further explaining a principle of the present invention and an aspect of an exemplary embodiment of a manufacturing method of the present invention.

As may be taken from FIG. 2a, a current I is applied to an end region of a region 4 to be magnetically encoded. This end region as already indicated above is indicated with reference numeral 10 and may be a circumferential region on the outer surface of the first sensor element 2. The current I is discharged from the first sensor element 2 at another end area of the magnetically encoded region (or of the region to be magnetically encoded) which is indicated by reference numeral 12 and also referred to a second location. The current is taken from the first sensor element at an outer surface thereof, preferably circumferentially in regions close or adjacent to location 12. As indicated by the dashed line between locations 10 and 12, the current I introduced at or along location 10 into the first sensor element flows through a core region or parallel to a core region to location 12. In other words, the current I flows through the region 4 to be encoded in the first sensor element 2.

Figure 2B:
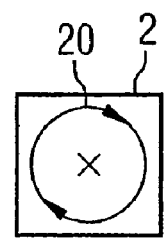

FIG. 2b shows a cross-sectional view along AA'. In the schematic representation of FIG. 2b, the current flow is indicated into the plane of the FIG. 2b as a cross. Here, the current flow is indicated in a center portion of the cross-section of the first sensor element 2. It is believed that this introduction of a current pulse having a form as described above or in the following and having a maximum as described above or in the following causes a magnetic flow structure 20 in the cross-sectional view with a magnetic flow direction into one direction here into the clockwise direction. The magnetic flow structure 20 depicted in FIG. 2b is depicted essentially circular. However, the magnetic flow structure 20 may be adapted to the actual cross-section of the first sensor element 2 and may be, for example, more elliptical.

Figure 3A:
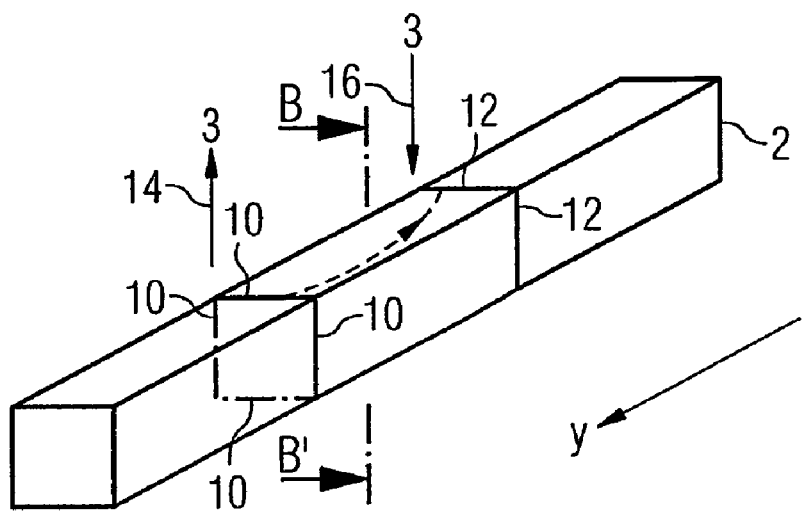
FIG. 3a shows another exemplary embodiment of a sensor element of a torque sensor according to the present invention for further explaining a principle of the present invention and an exemplary embodiment of a method of manufacturing a torque sensor according to the present invention.
Figure 3B:
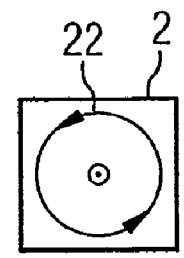

FIGS. 3a and 3b show a step of the method according to an exemplary embodiment of the present invention which may be applied after the step depicted in FIGS. 2a and 2b. FIG. 3a shows a first sensor element according to an exemplary embodiment of the present invention with the application of a second current pulse and FIG. 3b shows a cross-sectional view along BB' of the first sensor element 2.

As may be taken from FIG. 3a, in comparison to FIG. 2a, in FIG. 3a, the current I indicated by arrow 16 is introduced into the sensor element 2 at or adjacent to location 12 and is discharged or taken from the sensor element 2 at or adjacent to the location 10. In other words, the current is discharged in FIG. 3a at a location where it was introduced in FIG. 2a and vice versa. Thus, the introduction and discharging of the current I into the first sensor element 2 in FIG. 3a may cause a current through the region 4 to be magnetically encoded opposite to the respective current flow in FIG. 2a.

The current is indicated in FIG. 3b in a core region of the sensor element 2. As may be taken from a comparison of FIGS. 2b and 3b, the magnetic flow structure 22 has a direction opposite to the current flow structure 20 in FIG. 2b.

Figure 4:
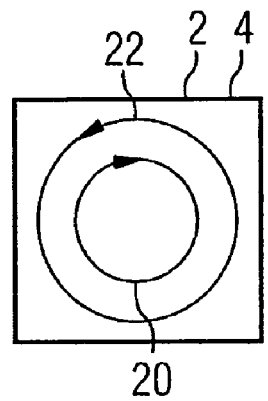
FIG. 4 shows a cross-sectional representation of the sensor element of the torque sensor of FIGS. 2a and 3a manufactured in accordance with a method according to an exemplary embodiment of the present invention.

As indicated before, the steps depicted in FIGS. 2a, 2b and 3a and 3b may be applied individually or may be applied in succession of each other. When firstly, the step depicted in FIGS. 2a and 2b is performed and then the step depicted in FIGS. 3a and 3b, a magnetic flow structure as depicted in the cross-sectional view through the encoded region 4 depicted in FIG. 4 may be caused. As may be taken from FIG. 4, the two current flow structures 20 and 22 are encoded into the encoded region together. Thus, in a direction essentially perpendicular to a surface of the first sensor element 2, in a direction to the core of the sensor element 2, there is a first magnetic flow having a first direction and then underlying there is a second magnetic flow having a second direction. As indicated in FIG. 4, the flow directions may be opposite to each other.

Thus, if there is no torque applied to the first torque sensor element 2, the two magnetic flow structures 20 and 22 may cancel each other such that there is essentially no magnetic field at the outside of the encoded region. However, in case a stress or force is applied to the first sensor element 2, the magnetic field structures 20 and 22 cease to cancel each other such that there is a magnetic field occurring at the outside of the encoded region which may then be detected by means of the secondary sensor element 6. This will be described in further detail in the following.

Figure 5:
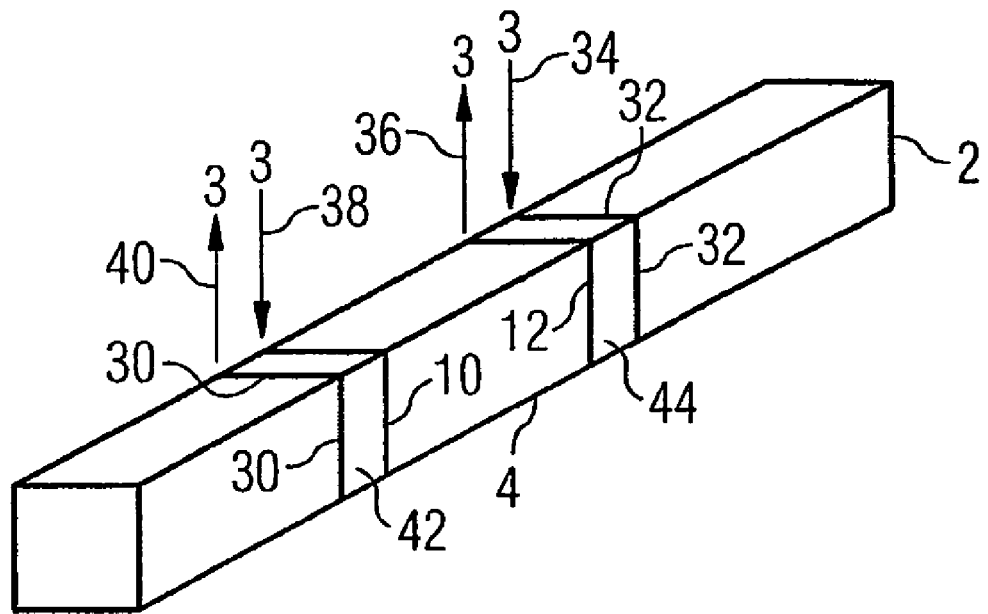
FIG. 5 shows another exemplary embodiment of a sensor element of a torque sensor according to the present invention for further explaining an exemplary embodiment of a manufacturing method of manufacturing a torque sensor according to the present invention.

FIG. 5 shows another exemplary of a first sensor element 2 according to an exemplary embodiment of the present invention as may be used in a torque sensor according to an exemplary embodiment which is manufactured according to a manufacturing method according to an exemplary embodiment of the present invention. As may be taken from FIG. 5, the first sensor element 2 has an encoded region 4 which is preferably encoded in accordance with the steps and arrangements depicted in FIGS. 2a, 2b, 3a, 3b and 4.

Adjacent to locations 10 and 12, there are provided pinning regions 42 and 44. These regions 42 and 44 are provided for avoiding a fraying of the encoded region 4. In other words, the pinning regions 42 and 44 may allow for a more definite beginning and end of the encoded region 4.

In short, the first pinning region 42 may be adapted by introducing a current 38 close or adjacent to the first location 10 into the first sensor element 2 in the same manner as described, for example, with reference to FIG. 2a. However, the current I is discharged from the first sensor element 2 at a first location 30 which is at a distance from the end of the encoded region close or at location 10. This further location is indicated by reference numeral 30. The introduction of this further current pulse I is indicated by arrow 38 and the discharging thereof is indicated by arrow 40. The current pulses may have the same form shaping maximum as described above.

For generating the second pinning region 44, a current is introduced into the first sensor element 2 at a location 32 which is at a distance from the end of the encoded region 4 close or adjacent to location 12. The current is then discharged from the first sensor element 2 at or close to the location 12. The introduction of the current pulse I is indicated by arrows 34 and 36.

The pinning regions 42 and 44 preferably are such that the magnetic flow structures of these pinning regions 42 and 44 are opposite to the respective adjacent magnetic flow structures in the adjacent encoded region 4. As may be taken from FIG. 5, the pinning regions can be coded to the first sensor element 2 after the coding or the complete coding of the encoded region 4.

Figure 6:
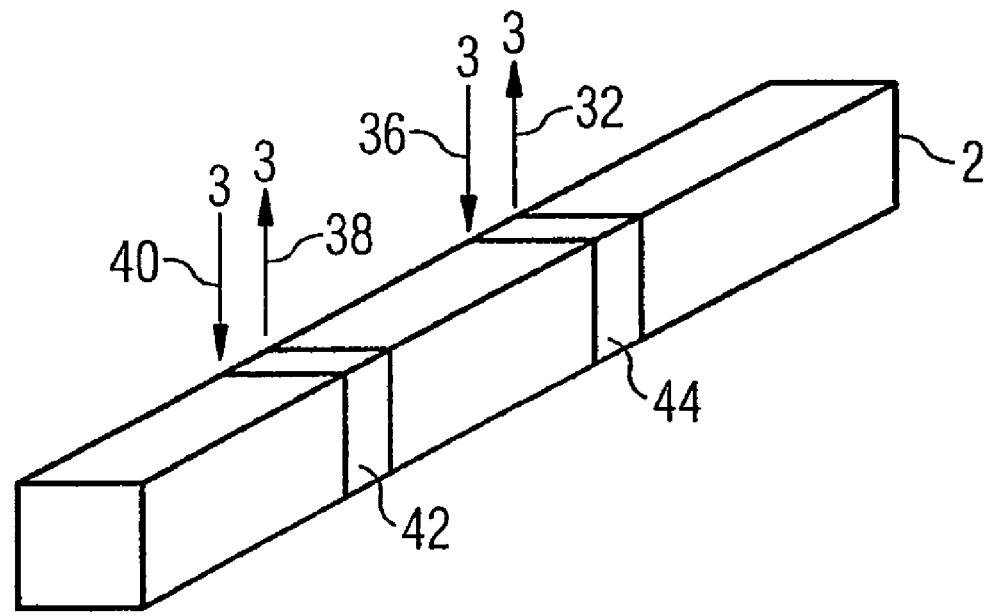
FIG. 6 shows another exemplary embodiment of a sensor element of a torque sensor according to the present invention for further explaining an exemplary embodiment of a manufacturing method for a torque sensor according to the present invention.

FIG. 6 shows another exemplary embodiment of the present invention where there is no encoding region 4. In other words, according to an exemplary embodiment of the present invention, the pinning regions may be coded into the first sensor element 2 before the actual coding of the magnetically encoded region 4.

Figure 7:
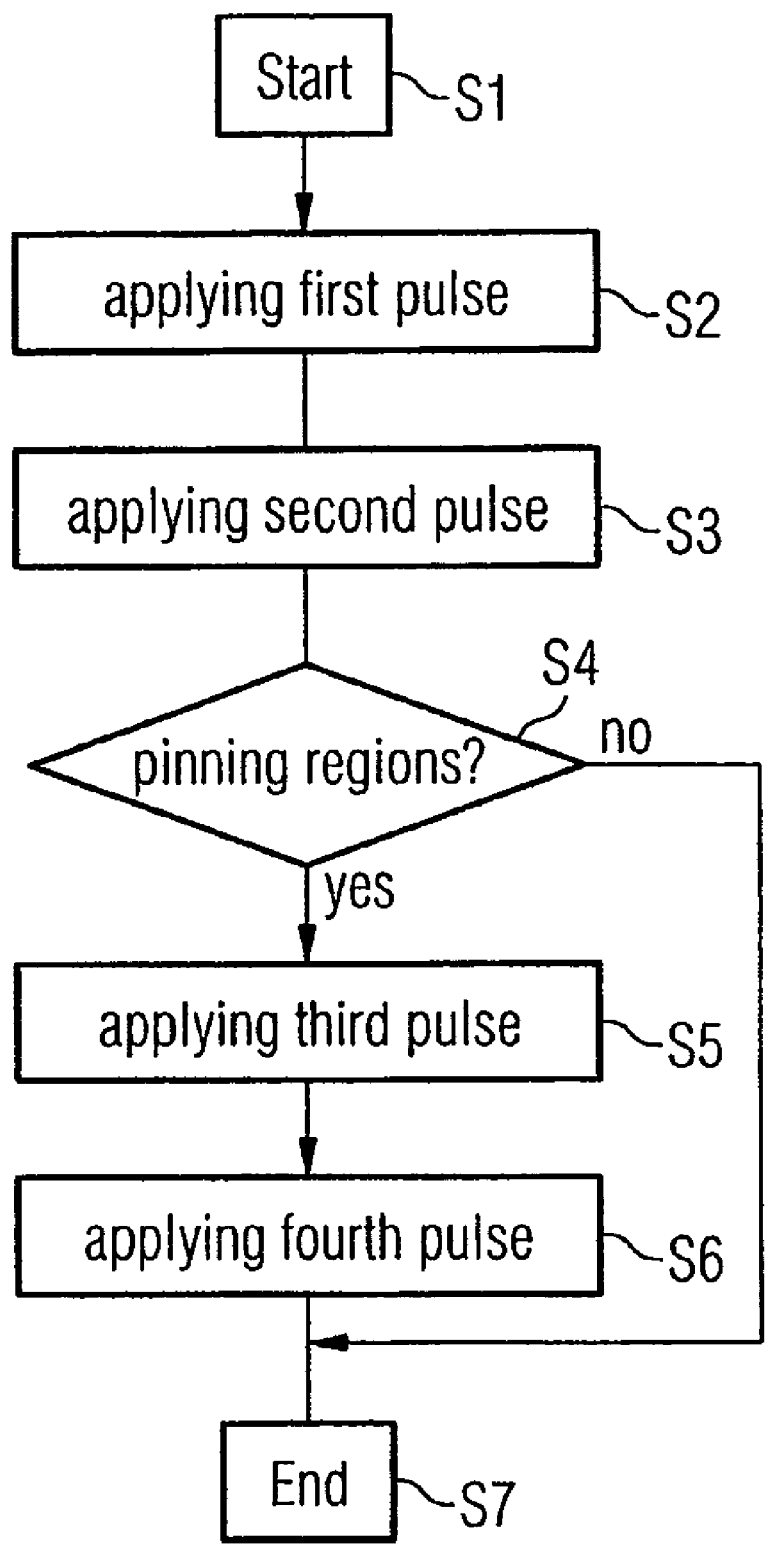
FIG. 7 shows a flow-chart for further explaining an exemplary embodiment of a method of manufacturing a torque sensor according to the present invention.

FIG. 7 shows a simplified flow-chart of a method of manufacturing a first sensor element 2 for a torque sensor according to an exemplary embodiment of the present invention.

After the start in step S1, the method continues to step S2 where a first pulse is applied as described as reference to FIGS. 2a and 2b. Then, after step S2, the method continues to step S3 where a second pulse is applied as described with reference to FIGS. 3a and 3b.

Then, the method continues to step S4 where it is decided whether the pinning regions are to be coded to the first sensor element 2 or not. If it is decided in step S4 that there will be no pinning regions, the method continues directly to step S7 where it ends.

If it is decided in step S4 that the pinning regions are to be coded to the first sensor element 2, the method continues to step S5 where a third pulse is applied to the pinning region 42 in the direction indicated by arrows 38 and 40 and to pinning region 44 indicated by the arrows 34 and 36. Then, the method continues to step S6 where force pulses applied to the respective pinning regions 42 and 44. To the pinning region 42, a force pulse is applied having a direction opposite to the direction indicated by arrows 38 and 40. Also, to the pinning region 44, a force pulse is applied to the pinning region having a direction opposite to the arrows 34 and 36. Then, the method continues to step S7 where it ends.

In other words, preferably two pulses are applied for encoding of the magnetically encoded region 4. Those current pulses preferably have an opposite direction. Furthermore, two pulses respectively having respective directions are applied to the pinning region 42 and to the pinning region 44.

Figure 8:
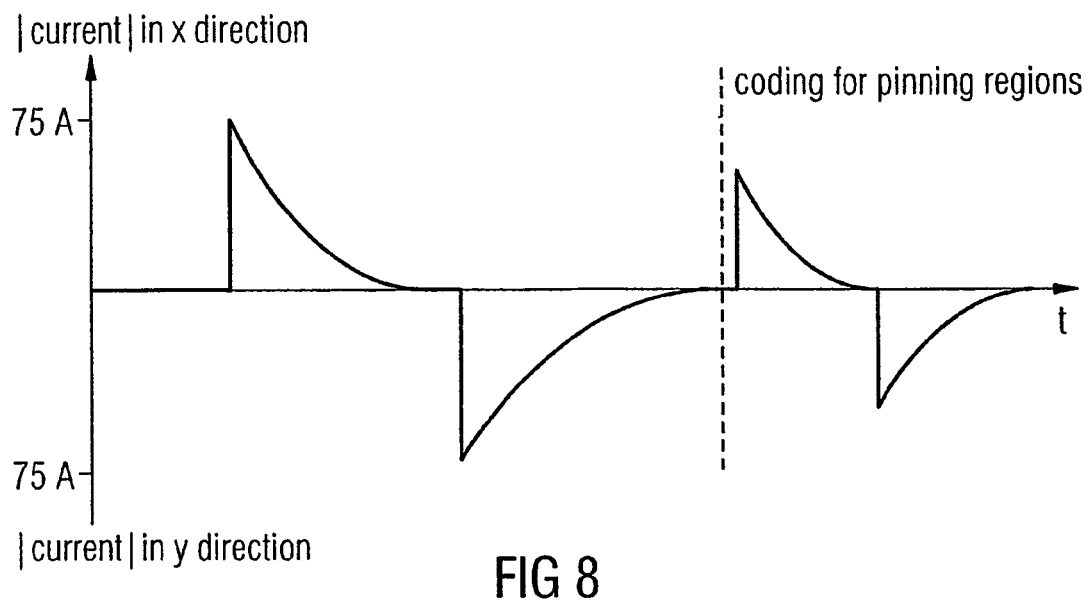
FIG. 8 shows a current versus time diagram for further explaining a method according to an exemplary embodiment of the present invention.

FIG. 8 shows a current versus time diagram of the pulses applied to the magnetically encoded region 4 and to the pinning regions. The positive direction of the y-axis of the diagram in FIG. 8 indicates a current flow into the x-direction and the negative direction of the y-axis of FIG. 8 indicates a current flow in the y-direction.

As may be taken from FIG. 8 for coding the magnetically encoded region 4, firstly a current pulse is applied having a direction into the x-direction. As may be taken from FIG. 8, the raising edge of the pulse is very sharp whereas the falling edge has a relatively long direction in comparison to the direction of the raising edge. As depicted in FIG. 8, the pulse may have a maximum of approximately 75 Ampere. In other applications, the pulse may be not as sharp as depicted in FIG. 8. However, the raising edge should be steeper or should have a shorter duration than the falling edge.

Then, a second pulse is applied to the encoded region 4 having an opposite direction. The pulse may have the same form as the first pulse. However, a maximum of the second pulse may also differ from the maximum of the first pulse. Although the immediate shape of the pulse may be different.

Then, for coding the pinning regions, pulses similar to the first and second pulse may be applied to the pinning regions as described with reference to FIGS. 5 and 6. Such pulses may be applied to the pinning regions simultaneously but also successfully for each pinning region. As depicted in FIG. 8, the pulses may have essentially the same form as the first and second pulses. However, a maximum may be smaller.

Figure 9:
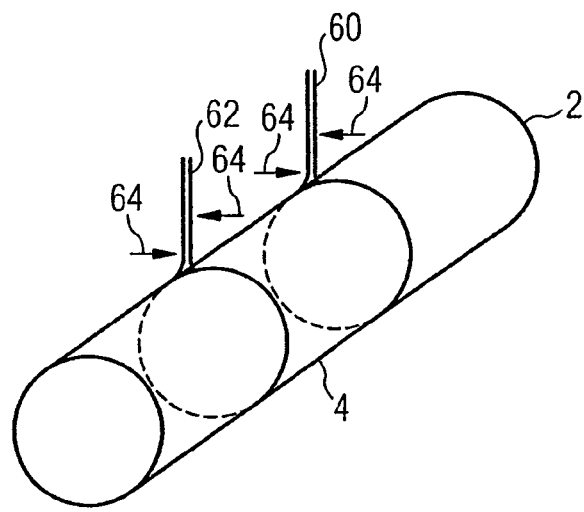
FIG. 9 shows another exemplary embodiment of a sensor element of a torque sensor according to the present invention with an electrode system according to an exemplary embodiment of the present invention.

FIG. 9 shows another exemplary embodiment of a first sensor element of a torque sensor according to an exemplary embodiment of the present invention showing an electrode arrangement for applying the current pulses for coding the magnetically encoded region 4. As may be taken from FIG. 9, a conductor without an isolation may be looped around the first sensor element 2 which is may be taken from FIG. 9 may be a circular shaft having a circular cross-section. For ensuring a close fit of the conductor on the outer surface of the first sensor element 2, the conductor may be clamped as shown by arrows 64.

Figure 10A:
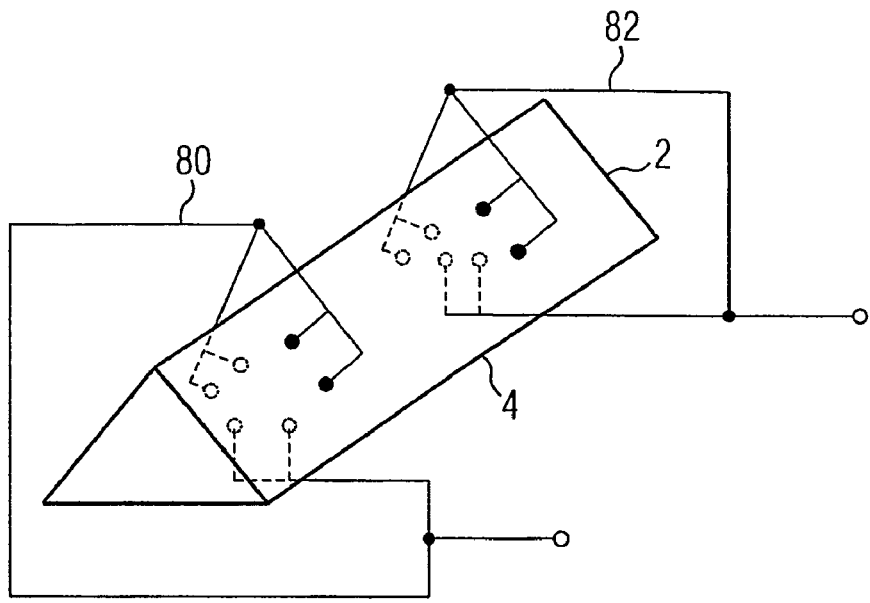
FIG. 10a shows another exemplary embodiment of a torque sensor according to the present invention with an electrode system according to an exemplary embodiment of the present invention.
Figure 10B:
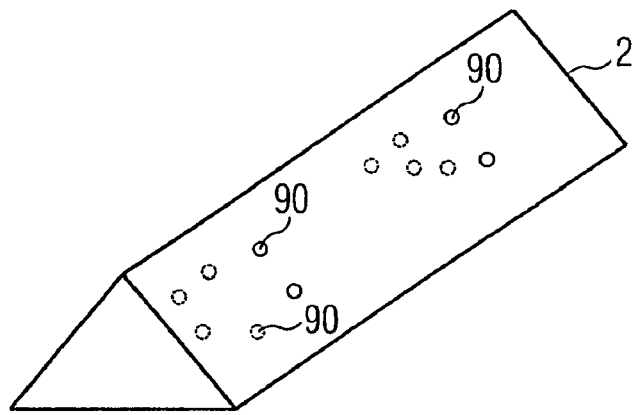

FIG. 10a shows another exemplary embodiment of a first sensor element according to an exemplary embodiment of the present invention. Furthermore, FIG. 10a shows another exemplary embodiment of an electrode system according to an exemplary embodiment of the present invention. The electrode system 80 and 82 depicted in FIG. 10a contacts the first sensor element 2 which has a triangular cross-section with two contact points at each phase of the triangular first sensor element at each side of the region 4 which is to be encoded as magnetically encoded region. Overall, there are six contact points at each side of the region 4. The individual contact points may be connected to each other and then connected to one individual contact points.

If there is only a limited number of contact points between the electrode system and the first sensor element 2 and if the current pulses applied are very high, differing contact resistances between the contacts of the electrode systems and the material of the first sensor element 2 may cause burn marks at the first sensor element 2 at contact point to the electrode systems. These burn marks 90 may be color changes, may be welding spots, may be annealed areas or may simply be burn marks. According to an exemplary embodiment of the present invention, the number of contact points is increased or even a contact surface is provided such that such burn marks 90 may be avoided.

Figure 11:
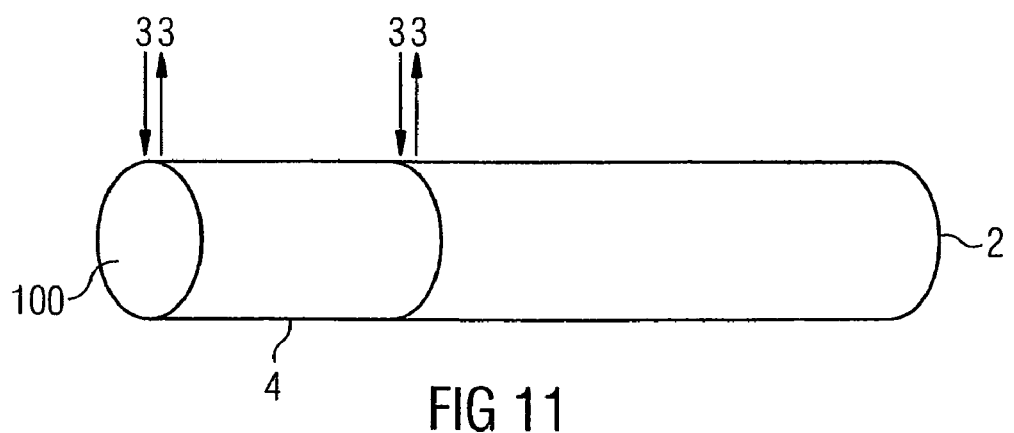
FIG. 11 shows another exemplary embodiment of a torque sensor element for a torque sensor according to the present invention.

FIG. 11 shows another exemplary embodiment of a first sensor element 2 which is a shaft having a circular cross-section according to an exemplary embodiment of the present invention. As may be taken from FIG. 11, the magnetically encoded region is at an end region of the first sensor element 2. According to an exemplary embodiment of the present invention, the magnetically encoded region 4 is not extend over the full length of the first sensor element 2. As may be taken from FIG. 11, it may be located at one end thereof. However, it has to be noted that according to an exemplary embodiment of the present invention, the current pulses are applied from an outer circumferential surface of the first sensor element 2 and not from the end face 100 of the first sensor element 2.

In the following, the so-called PCME ("Pulse-Current-Modulated Encoding") Sensing Technology will be described in detail, which can, according to a preferred embodiment of the invention, be implemented to magnetize a magnetizable object which is then partially demagnetized according to the invention. In the following, the PCME technology will partly described in the context of torque sensing. However, this concept may implemented in the context of position sensing as well.

In this description, there are a number of acronyms used as otherwise some explanations and descriptions may be difficult to read. While the acronyms "ASIC", "IC", and "PCB" are already market standard definitions, there are many terms that are particularly related to the magnetostriction based NCT sensing technology. It should be noted that in this description, when there is a reference to NCT technology or to PCME, it is referred to exemplary embodiments of the present invention.

Table 1 shows a list of abbreviations used in the following description of the PCME technology.

TABLE 1

List of abbreviations

| Acronym | Description | Category |
| --- | --- | --- |
| ASIC | Application Specific IC | Electronics |
| DF | Dual Field | Primary Sensor |
| EMF | Earth Magnetic Field | Test Criteria |
| FS | Full Scale | Test Criteria |
| Hot-Spotting | Sensitivity to nearby Ferro magnetic material | Specification |
| IC | Integrated Circuit | Electronics |
| MFS Component | Magnetic Field Sensor | Sensor |
| NCT | Non Contact Torque | Technology |
| PCB | Printed Circuit Board | Electronics |
| PCME | Pulse Current Modulated Encoding | Technology |
| POC | Proof-of-Concept | |
| RSU | Rotational Signal Uniformity | Specification |
| SCSP | Signal Conditioning & Signal Processing | Electronics |
| SF | Single Field | Primary Sensor |
| SH | Sensor Host | Primary Sensor |
| SPHC | Shaft Processing Holding Clamp | Processing Tool |
| SSU | Secondary Sensor Unit | Sensor Component |

The magnetic principle based mechanical-stress sensing technology allows to design and to produce a wide range of "physical-parameter-sensors" (like Force Sensing, Torque Sensing, and Material Diagnostic Analysis) that can be applied where Ferro-Magnetic materials are used. The most common technologies used to build "magnetic-principle-based" sensors are: Inductive differential displacement measurement (requires torsion shaft), measuring the changes of the materials permeability, and measuring the magnetostriction effects.

Over the last 20 years a number of different companies have developed their own and very specific solution in how to design and how to produce a magnetic principle based torque sensor (i.e. ABB, FAST, Frauenhofer Institute, FT, Kubota, MDI, NCTE, RM, Siemens, and others). These technologies are at various development stages and differ in "how-it-works", the achievable performance, the systems reliability, and the manufacturing/system cost.

Some of these technologies require that mechanical changes are made to the shaft where torque should be measured (chevrons), or rely on the mechanical torsion effect (require a long shaft that twists under torque), or that something will be attached to the shaft itself (press-fitting a ring of certain properties to the shaft surface), or coating of the shaft surface with a special substance. No-one has yet mastered a high-volume manufacturing process that can be applied to (almost) any shaft size, achieving tight performance tolerances, and is not based on already existing technology patents.

In the following, a magnetostriction principle based Non-Contact-Torque (NCT) Sensing Technology is described that offers to the user a whole host of new features and improved performances, previously not available. This technology enables the realization of a fully-integrated (small in space), real-time (high signal bandwidth) torque measurement, which is reliable and can be produced at an affordable cost, at any desired quantities. This technology is called: PCME (for Pulse-Current-Modulated Encoding) or Magnetostriction Transversal Torque Sensor.

The PCME technology can be applied to the shaft without making any mechanical changes to the shaft, or without attaching anything to the shaft. Most important, the PCME technology can be applied to any shaft diameter (most other technologies have here a limitation) and does not need to rotate/spin the shaft during the encoding process (very simple and low-cost manufacturing process) which makes this technology very applicable for high-volume application.

In the following, a Magnetic Field Structure (Sensor Principle) will be described.

The sensor life-time depends on a "closed-loop" magnetic field design. The PCME technology is based on two magnetic field structures, stored above each other, and running in opposite directions. When no torque stress or motion stress is applied to the shaft (also called Sensor Host, or SH) then the SH will act magnetically neutral (no magnetic field can be sensed at the outside of the SH).

Figure 12:
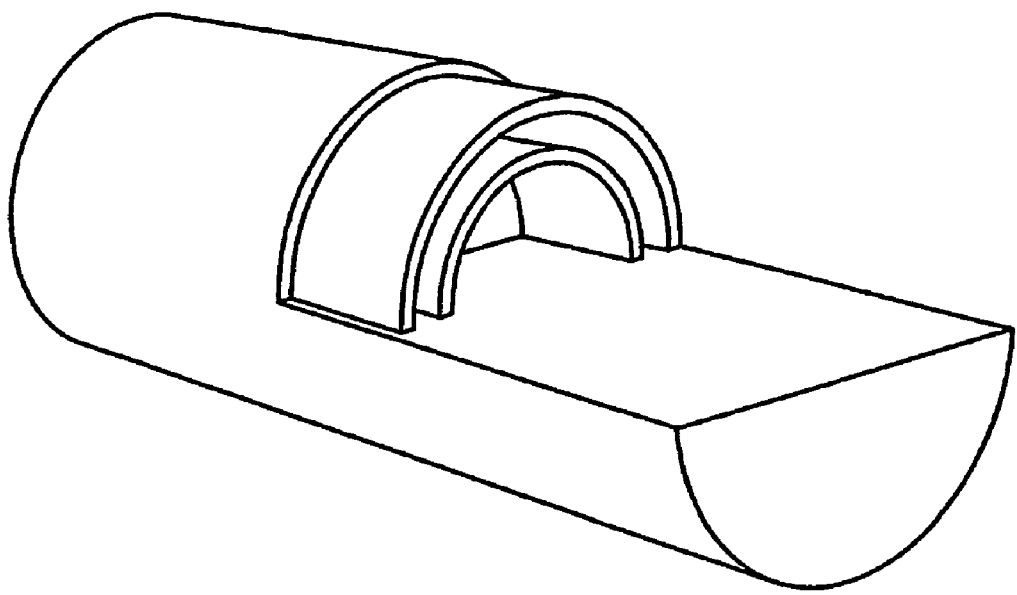
FIG. 12 shows a schematic diagram of a sensor element of a torque sensor according to another exemplary embodiment of the present invention showing that two magnetic fields may be stored in the shaft and running in endless circles.

FIG. 12 shows that two magnetic fields are stored in the shaft and running in endless circles. The outer field runs in one direction, while the inner field runs in the opposite direction.

Figure 13:
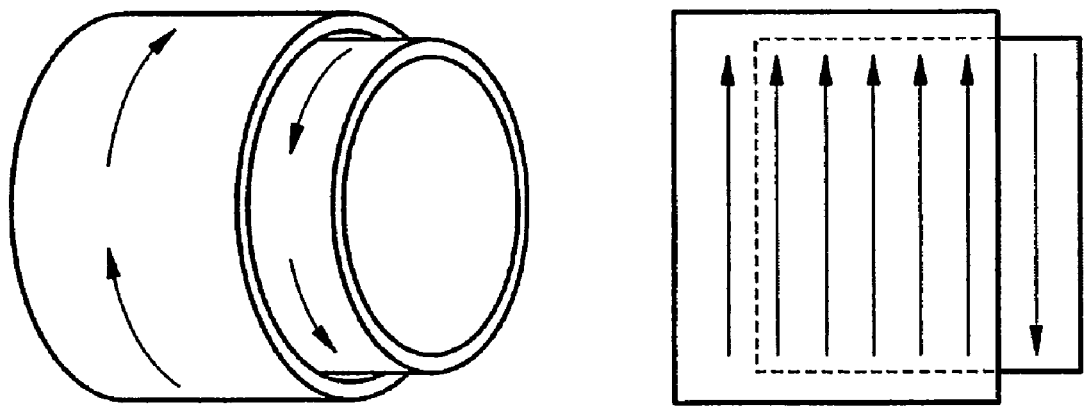
FIG. 13 is another schematic diagram for illustrating PCME sensing technology using two counter cycle or magnetic field loops which may be generated in accordance with a manufacturing method according to the present invention.

FIG. 13 illustrates that the PCME sensing technology uses two Counter-Circular magnetic field loops that are stored on top of each other (Picky-Back mode).

When mechanical stress (like reciprocation motion or torque) is applied at both ends of the PCME magnetized SH (Sensor Host, or Shaft) then the magnetic flux lines of both magnetic structures (or loops) will tilt in proportion to the applied torque.

As illustrated in FIG. 14, when no mechanical stresses are applied to the SH the magnetic flux lines are running in its original path. When mechanical stresses are applied the magnetic flux lines tilt in proportion to the applied stress (like linear motion or torque).

Depending on the applied torque direction (clockwise or anti-clockwise, in relation to the SH) the magnetic flux lines will either tilt to the right or tilt to the left. Where the magnetic flux lines reach the boundary of the magnetically encoded region, the magnetic flux lines from the upper layer will join-up with the magnetic flux lines from the lower layer and visa-versa. This will then form a perfectly controlled toroidal shape.

The benefits of such a magnetic structure are:
  Reduced (almost eliminated) parasitic magnetic field structures when mechanical stress is applied to the SH (this will result in better RSU performances).
  Higher Sensor-Output Signal-Slope as there are two "active" layers that compliment each other when generating a mechanical stress related signal. Explanation: When using a single-layer sensor design, the "tilted" magnetic flux lines that exit at the encoding region boundary have to create a "return passage" from one boundary side to the other. This effort effects how much signal is available to be sensed and measured outside of the SH with the secondary sensor unit.

There are almost no limitations on the SH (shaft) dimensions where the PCME technology will be applied to. The dual layered magnetic field structure can be adapted to any solid or hollow shaft dimensions.

The physical dimensions and sensor performances are in a very wide range programmable and therefore can be tailored to the targeted application.

This sensor design allows to measure mechanical stresses coming from all three dimensions axis, including in-line forces applied to the shaft (applicable as a load-cell). Explanation: Earlier magnetostriction sensor designs (for example from FAST Technology) have been limited to be sensitive in 2 dimensional axis only, and could not measure in-line forces.

Referring to FIG. 15, when torque is applied to the SH, the magnetic flux lines from both Counter-Circular magnetic loops are connecting to each other at the sensor region boundaries.

When mechanical torque stress is applied to the SH then the magnetic field will no longer run around in circles but tilt slightly in proportion to the applied torque stress. This will cause the magnetic field lines from one layer to connect to the magnetic field lines in the other layer, and with this form a toroidal shape.

Referring to FIG. 16, an exaggerated presentation is shown of how the magnetic flux line will form an angled toroidal structure when high levels of torque are applied to the SH.

In the following, features and benefits of the PCM-Encoding (PCME) Process will be described.

The magnetostriction NCT sensing technology from NCTE according to the present invention offers high performance sensing features like:
  No mechanical changes required on the Sensor Host (already existing shafts can be used as they are)
  Nothing has to be attached to the Sensor Host (therefore nothing can fall off or change over the shaft-lifetime=high MTBF)
  During measurement the SH can rotate, reciprocate or move at any desired speed (no limitations on rpm)
  Very good RSU (Rotational Signal Uniformity) performances
  Excellent measurement linearity (up to 0.01% of FS)
  High measurement repeatability
  Very high signal resolution (better than 14 bit)
  Very high signal bandwidth (better than 10 kHz)

Depending on the chosen type of magnetostriction sensing technology, and the chosen physical sensor design, the mechanical power transmitting shaft (also called "Sensor Host" or in short "SH") can be used "as is" without making any mechanical changes to it or without attaching anything to the shaft. This is then called a "true" Non-Contact-Torque measurement principle allowing the shaft to rotate freely at any desired speed in both directions.

The here described PCM-Encoding (PCME) manufacturing process according to an exemplary embodiment of the present invention provides additional features no other magnetostriction technology can offer (Uniqueness of this technology):

More then three times signal strength in comparison to alternative magnetostriction encoding processes (like the "RS" process from FAST).

Easy and simple shaft loading process (high manufacturing through-putt).

No moving components during magnetic encoding process (low complexity manufacturing equipment=high MTBF, and lower cost).

Process allows NCT sensor to be "fine-tuning" to achieve target accuracy of a fraction of one percent.

Manufacturing process allows shaft "pre-processing" and "post-processing" in the same process cycle (high manufacturing through-putt).

Sensing technology and manufacturing process is ratiometric and therefore is applicable to all shaft or tube diameters.

The PCM-Encoding process can be applied while the SH is already assembled (depending on accessibility) (maintenance friendly).

Final sensor is insensitive to axial shaft movements (the actual allowable axial shaft movement depends on the physical "length" of the magnetically encoded region).

Magnetically encoded SH remains neutral and has little to non magnetic field when no forces (like torque) are applied to the SH.

Sensitive to mechanical forces in all three dimensional axis.

In the following, the Magnetic Flux Distribution in the SH will be described.

The PCME processing technology is based on using electrical currents, passing through the SH (Sensor Host or Shaft) to achieve the desired, permanent magnetic encoding of the Ferro-magnetic material. To achieve the desired sensor performance and features a very specific and well controlled electrical current is required. Early experiments that used DC currents failed because of luck of understanding how small amounts and large amounts of DC electric current are travelling through a conductor (in this case the "conductor" is the mechanical power transmitting shaft, also called Sensor Host or in short "SH").

Figure 17:
FIGS. 17-22 are schematic representations for further explaining a principle of an exemplary embodiment of the present invention.

Referring to FIG. 17, an assumed electrical current density in a conductor is illustrated.

It is widely assumed that the electric current density in a conductor is evenly distributed over the entire cross-section of the conductor when an electric current (DC) passes through the conductor.

Figure 18:
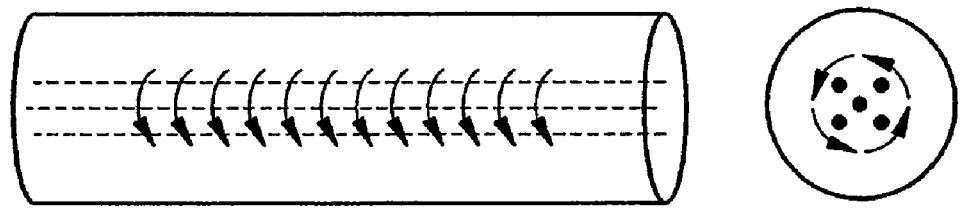

Referring to FIG. 18, a small electrical current forming magnetic field that ties current path in a conductor is shown.

It is our experience that when a small amount of electrical current (DC) is passing through the conductor that the current density is highest at the centre of the conductor. The two main reasons for this are: The electric current passing through a conductor generates a magnetic field that is tying together the current path in the centre of the conductor, and the impedance is the lowest in the centre of the conductor.

Figure 19:
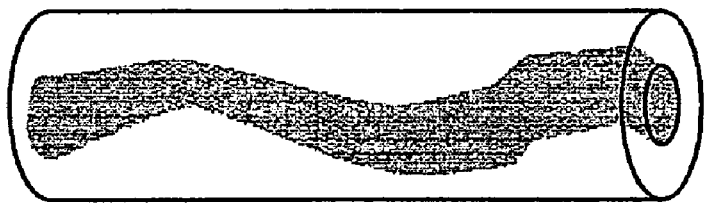

Referring to FIG. 19, a typical flow of small electrical currents in a conductor is illustrated.

In reality, however, the electric current may not flow in a "straight" line from one connection pole to the other (similar to the shape of electric lightening in the sky).

At a certain level of electric current the generated magnetic field is large enough to cause a permanent magnetization of the Ferro-magnetic shaft material. As the electric current is flowing near or at the centre of the SH, the permanently stored magnetic field will reside at the same location: near or at the centre of the SH. When now applying mechanical torque or linear force for oscillation/reciprocation to the shaft, then shaft internally stored magnetic field will respond by tilting its magnetic flux path in accordance to the applied mechanical force. As the permanently stored magnetic field lies deep below the shaft surface the measurable effects are very small, not uniform and therefore not sufficient to build a reliable NCT sensor system.

Figure 20:
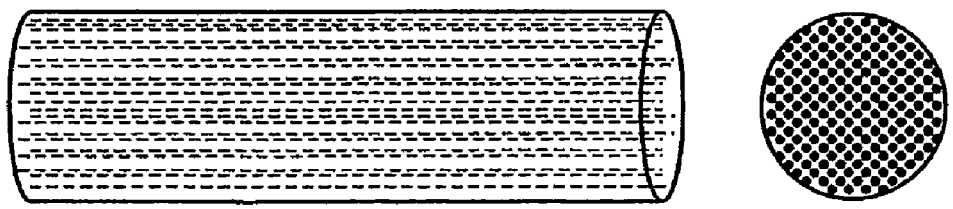

Referring to FIG. 20, a uniform current density in a conductor at saturation level is shown.

Only at the saturation level is the electric current density (when applying DC) evenly distributed at the entire cross section of the conductor. The amount of electrical current to achieve this saturation level is extremely high and is mainly influenced by the cross section and conductivity (impedance) of the used conductor.

Figure 21:
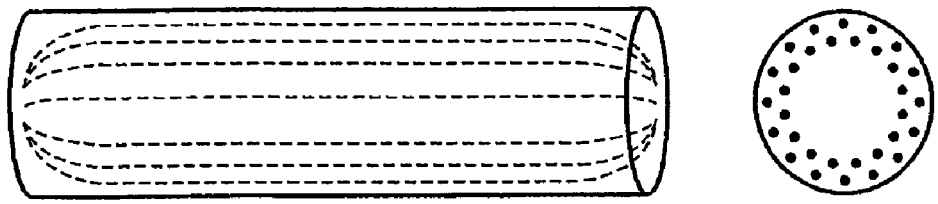

Referring to FIG. 21, electric current travelling beneath or at the surface of the conductor (Skin-Effect) is shown.

It is also widely assumed that when passing through alternating current (like a radio frequency signal) through a conductor that the signal is passing through the skin layers of the conductor, called the Skin Effect. The chosen frequency of the alternating current defines the "Location/position" and "depth" of the Skin Effect. At high frequencies the electrical current will travel right at or near the surface of the conductor (A) while at lower frequencies (in the 5 to 10 Hz regions for a 20 mm diameter SH) the electrical alternating current will penetrate more the centre of the shafts cross section (E). Also, the relative current density is higher in the current occupied regions at higher AC frequencies in comparison to the relative current density near the centre of the shaft at very low AC frequencies (as there is more space available for the current to flow through).

Figure 22:
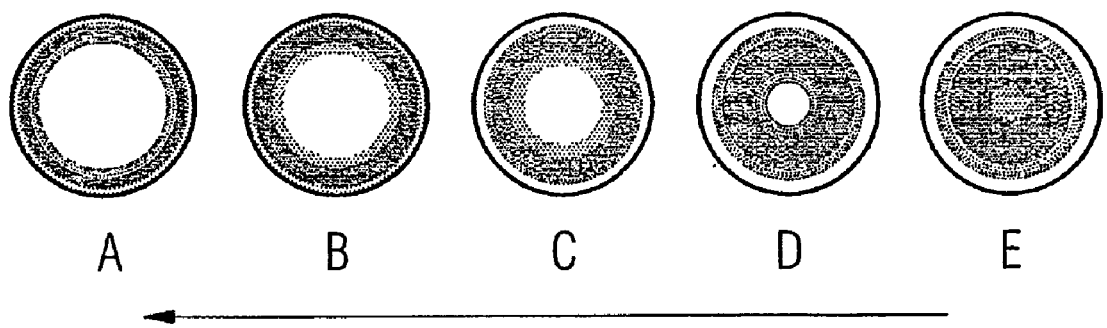

Referring to FIG. 22, the electrical current density of an electrical conductor (cross-section 90 deg to the current flow) when passing through the conductor an alternating current at different frequencies is illustrated.

The desired magnetic field design of the PCME sensor technology are two circular magnetic field structures, stored in two layers on top of each other ("Picky-Back"), and running in opposite direction to each other (Counter-Circular).

Again referring to FIG. 13, a desired magnetic sensor structure is shown: two endless magnetic loops placed on top of each other, running in opposite directions to each other: Counter-Circular "Picky-Back" Field Design.

To make this magnetic field design highly sensitive to mechanical stresses that will be applied to the SH (shaft), and to generate the largest sensor signal possible, the desired magnetic field structure has to be placed nearest to the shaft surface. Placing the circular magnetic fields to close to the centre of the SH will cause damping of the user available sensor-output-signal slope (most of the sensor signal will travel through the Ferro-magnetic shaft material as it has a much higher permeability in comparison to air), and increases the non-uniformity of the sensor signal (in relation to shaft rotation and to axial movements of the shaft in relation to the secondary sensor.

Figure 23:
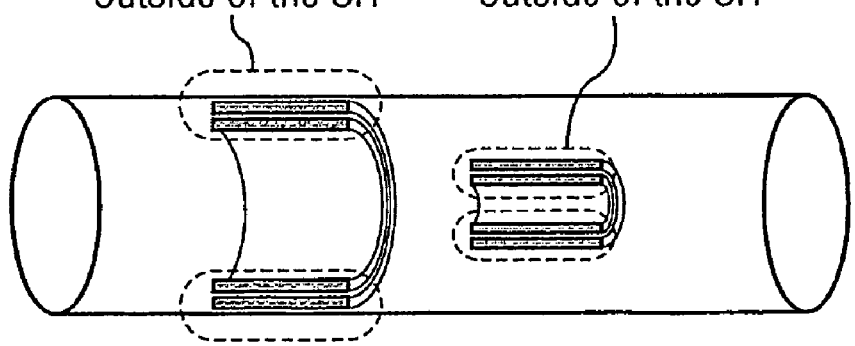
FIG. 23 is another schematic diagram for explaining a principle of an exemplary embodiment of the present invention.

Referring to FIG. 23, magnetic field structures stored near the shaft surface and stored near the centre of the shaft are illustrated.

It may be difficult to achieve the desired permanent magnetic encoding of the SH when using AC (alternating current) as the polarity of the created magnetic field is constantly changing and therefore may act more as a Degaussing system.

The PCME technology requires that a strong electrical current ("uni-polar" or DC, to prevent erasing of the desired magnetic field structure) is travelling right below the shaft surface (to ensure that the sensor signal will be uniform and measurable at the outside of the shaft). In addition a Counter-Circular, "picky back" magnetic field structure needs to be formed.

It is possible to place the two Counter-Circular magnetic field structures in the shaft by storing them into the shaft one after each other. First the inner layer will be stored in the SH, and then the outer layer by using a weaker magnetic force (preventing that the inner layer will be neutralized and deleted by accident. To achieve this, the known "permanent" magnet encoding techniques can be applied as described in patents from FAST technology, or by using a combination of electrical current encoding and the "permanent" magnet encoding.

A much simpler and faster encoding process uses "only" electric current to achieve the desired Counter-Circular "Picky-Back" magnetic field structure. The most challenging part here is to generate the Counter-Circular magnetic field.

A uniform electrical current will produce a uniform magnetic field, running around the electrical conductor in a 90 deg angle, in relation to the current direction (A). When placing two conductors side-by-side (B) then the magnetic field between the two conductors seems to cancel-out the effect of each other (C). Although still present, there is no detectable (or measurable) magnetic field between the closely placed two conductors. When placing a number of electrical conductors side-by-side (D) the "measurable" magnetic field seems to go around the outside the surface of the "flat" shaped conductor.

Figure 24:
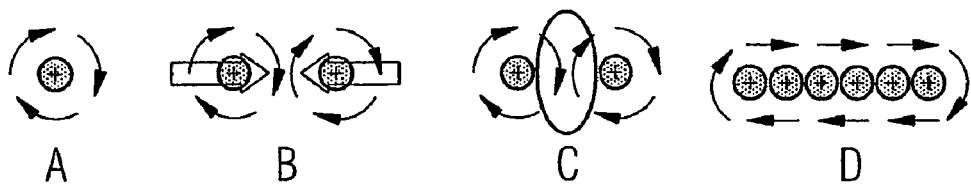
FIGS. 24, 25 and 26 are schematic diagrams for further explaining a principle of an exemplary embodiment of the present invention.

Referring to FIG. 24, the magnetic effects when looking at the cross-section of a conductor with a uniform current flowing through them are shown.

The "flat" or rectangle shaped conductor has now been bent into a "U"-shape. When passing an electrical current through the "U"-shaped conductor then the magnetic field following the outer dimensions of the "U"-shape is cancelling out the measurable effects in the inner halve of the "U".

Figure 25:
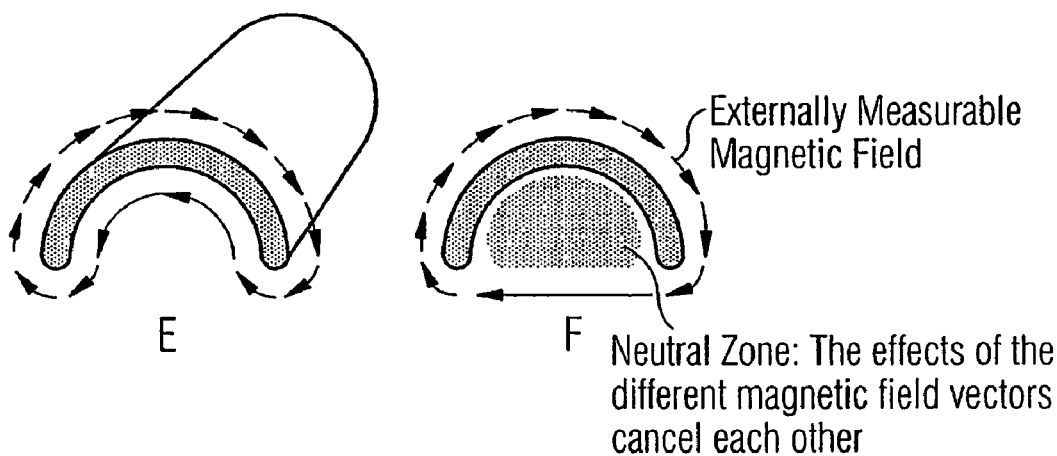

Referring to FIG. 25, the zone inside the "U"-shaped conductor seem to be magnetically "Neutral" when an electrical current is flowing through the conductor.

When no mechanical stress is applied to the cross-section of a "U"-shaped conductor it seems that there is no magnetic field present inside of the "U" (F). But when bending or twisting the "U"-shaped conductor the magnetic field will no longer follow its original path (90 deg angle to the current flow). Depending on the applied mechanical forces, the magnetic field begins to change slightly its path. At that time the magnetic-field-vector that is caused by the mechanical stress can be sensed and measured at the surface of the conductor, inside and outside of the "U"-shape. Note: This phenomena is applies only at very specific electrical current levels.

The same applies to the "O"-shaped conductor design. When passing a uniform electrical current through an "O"-shaped conductor (Tube) the measurable magnetic effects inside of the "O" (Tube) have cancelled-out each other (G).

Figure 26:
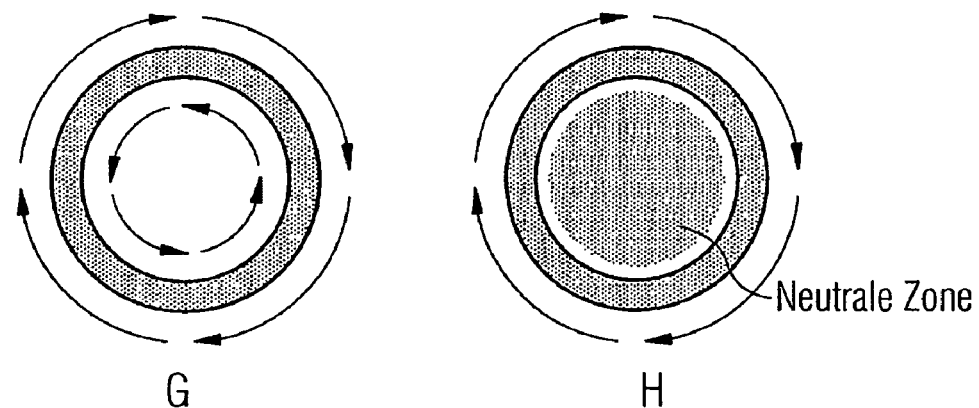

Referring to FIG. 26, the zone inside the "O"-shaped conductor seem to be magnetically "Neutral" when an electrical current is flowing through the conductor.

However, when mechanical stresses are applied to the "O"-shaped conductor (Tube) it becomes evident that there has been a magnetic field present at the inner side of the "O"-shaped conductor. The inner, counter directional magnetic field (as well as the outer magnetic field) begins to tilt in relation to the applied torque stresses. This tilting field can be clearly sensed and measured.

In the following, an Encoding Pulse Design will be described.

To achieve the desired magnetic field structure (Counter-Circular, Picky-Back, Fields Design) inside the SH, according to an exemplary embodiment of a method of the present invention, unipolar electrical current pulses are passed through the Shaft (or SH). By using "pulses" the desired "Skin-Effect" can be achieved. By using a "unipolar" current direction (not changing the direction of the electrical current) the generated magnetic effect will not be erased accidentally.

The used current pulse shape is most critical to achieve the desired PCME sensor design. Each parameter has to be accurately and repeatable controlled: Current raising time, Constant current on-time, Maximal current amplitude, and Current falling time. In addition it is very critical that the current enters and exits very uniformly around the entire shaft surface.

In the following, a Rectangle Current Pulse Shape will be described.

Figure 27:
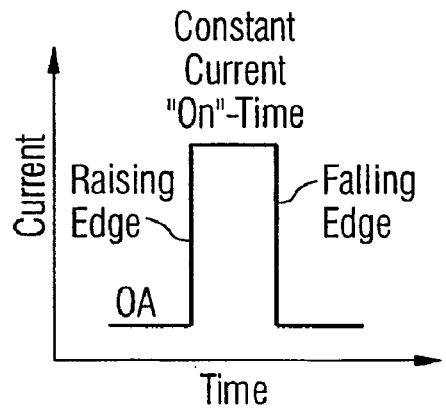
FIG. 27 is a current versus time diagram for illustrating a current pulse which may be applied to a sensor element according to a manufacturing method according to an exemplary embodiment of the present invention.

Referring to FIG. 27, a rectangle shaped electrical current pulse is illustrated.

A rectangle shaped current pulse has a fast raising positive edge and a fast falling current edge. When passing a rectangle shaped current pulse through the SH, the raising edge is responsible for forming the targeted magnetic structure of the PCME sensor while the flat "on" time and the falling edge of the rectangle shaped current pulse are counter productive.

Figure 28:
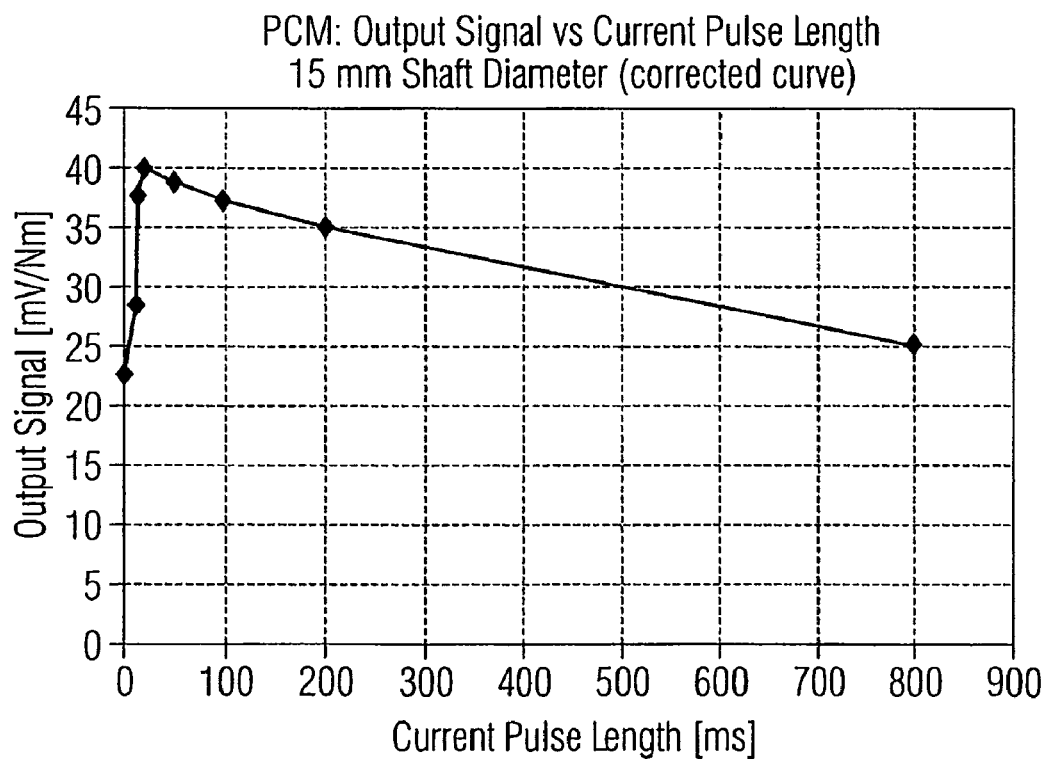
FIG. 28 shows an output signal versus current pulse length diagram according to an exemplary embodiment of the present invention.

Referring to FIG. 28, a relationship between rectangles shaped Current Encoding Pulse-Width (Constant Current On-Time) and Sensor Output Signal Slope is shown.

In the following example a rectangle shaped current pulse has been used to generate and store the Couter-Circilar "Picky-Back" field in a 15 mm diameter, 14CrNi14 shaft. The pulsed electric current had its maximum at around 270 Ampere. The pulse "on-time" has been electronically controlled. Because of the high frequency component in the rising and falling edge of the encoding pulse, this experiment can not truly represent the effects of a true DC encoding SH. Therefore the Sensor-Output-Signal Slope-curve eventually flattens-out at above 20 mV/Nm when passing the Constant-Current On-Time of 1000 ms.

Without using a fast raising current-pulse edge (like using a controlled ramping slope) the sensor output signal slope would have been very poor (below 10 mV/Nm). Note: In this experiment (using 14CrNi14) the signal hysteresis was around 0.95% of the FS signal (FS=75 Nm torque).

Figure 29:
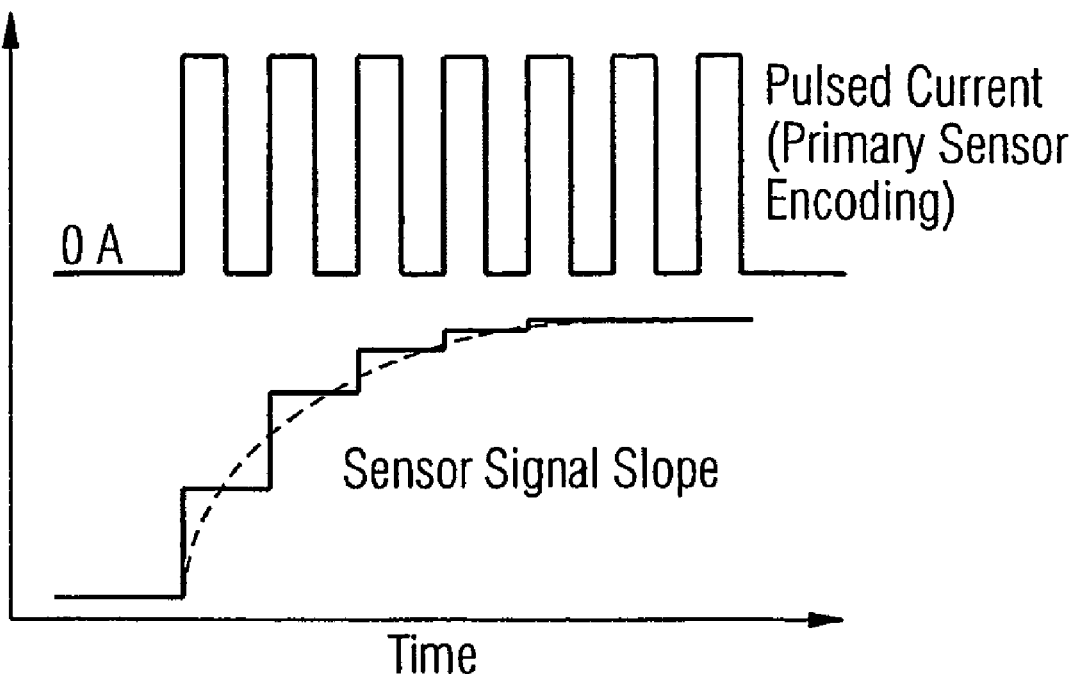
FIG. 29 shows a current versus time diagram with current pulses according to an exemplary embodiment of the present invention which may be applied to sensor elements according to a method of the present invention.

Referring to FIG. 29, increasing the Sensor-Output Signal-Slope by using several rectangle shaped current pulses in succession is shown.

The Sensor-Output-Signal slope can be improved when using several rectangle shaped current-encoding-pulses in successions. In comparisons to other encoding-pulse-shapes the fast falling current-pulse signal slope of the rectangle shaped current pulse will prevent that the Sensor-Output-Signal slope may ever reach an optimal performance level. Meaning that after only a few current pulses (2 to 10) have been applied to the SH (or Shaft) the Sensor-Output Signal-Slope will no longer rise.

In the following, a Discharge Current Pulse Shape is described.

The Discharge-Current-Pulse has no Constant-Current ON-Time and has no fast falling edge. Therefore the primary and most felt effect in the magnetic encoding of the SH is the fast raising edge of this current pulse type.

Figure 30:
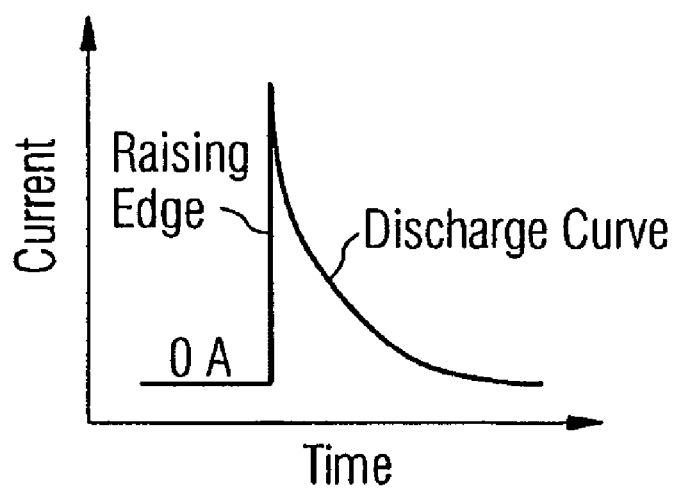
FIG. 30 shows another current versus time diagram showing a preferred embodiment of a current pulse applied to a sensor element such as a shaft according to a method of an exemplary embodiment of the present invention.

As shown in FIG. 30, a sharp raising current edge and a typical discharging curve provides best results when creating a PCME sensor.

Figure 31:
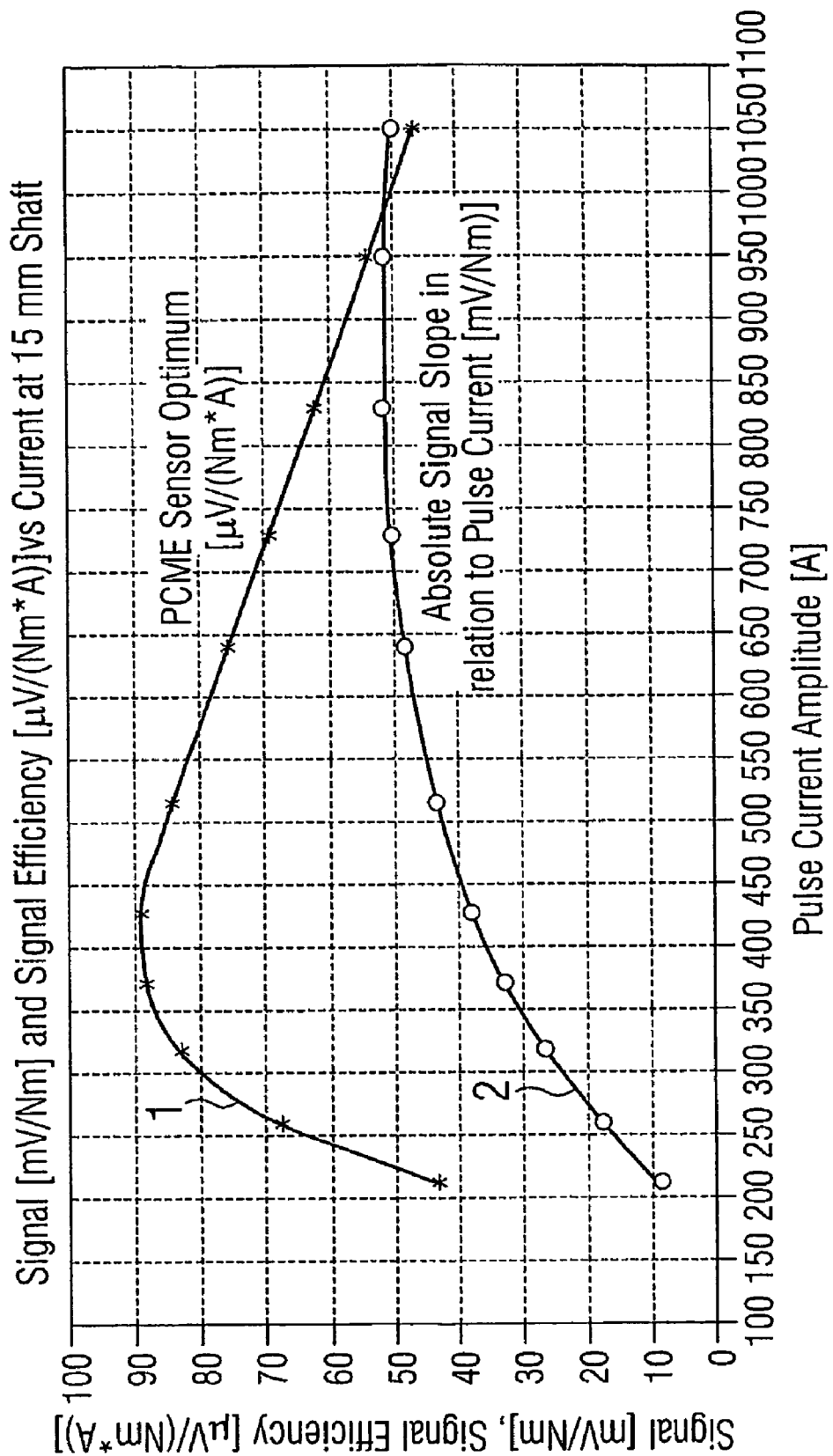
FIG. 31 shows a signal and signal efficiency versus current diagram in accordance with an exemplary embodiment of the present invention.

Referring to FIG. 31, a PCME Sensor-Output Signal-Slope optimization by identifying the right pulse current is illustrated.

At the very low end of the pulse current scale (0 to 75 A for a 15 mm diameter shaft, 14CrNi14 shaft material) the "Discharge-Current-Pulse type is not powerful enough to cross the magnetic threshold needed to create a lasting magnetic field inside the Ferro magnetic shaft. When increasing the pulse current amplitude the double circular magnetic field structure begins to form below the shaft surface. As the pulse current amplitude increases so does the achievable torque sensor-output signal-amplitude of the secondary sensor system. At around 400 A to 425 A the optimal PCME sensor design has been achieved (the two counter flowing magnetic regions have reached their most optimal distance to each other and the correct flux density for best sensor performances.

Figure 32:
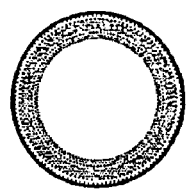
FIG. 32 is a cross-sectional view of a sensor element having a preferred PCME electrical current density according to an exemplary embodiment of the present invention.

Referring to FIG. 32, Sensor Host (SH) cross section with the optimal PCME electrical current density and location during the encoding pulse is illustrated.

When increasing further the pulse current amplitude the absolute, torque force related, sensor signal amplitude will further increase (curve 2) for some time while the overall PCME-typical sensor performances will decrease (curve 1). When passing 900 A Pulse Current Amplitude (for a 15 mm diameter shaft) the absolute, torque force related, sensor signal amplitude will begin to drop as well (curve 2) while the PCME sensor performances are now very poor (curve 1).

Figure 33:
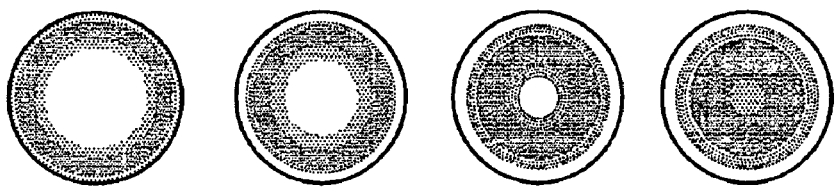
FIG. 33 shows a cross-sectional view of a sensor element and an electrical pulse current density at different and increasing pulse current levels according to an exemplary embodiment of the present invention.

Referring to FIG. 33, Sensor Host (SH) cross sections and the electrical pulse current density at different and increasing pulse current levels is shown.

As the electrical current occupies a larger cross section in the SH the spacing between the inner circular region and the outer (near the shaft surface) circular region becomes larger.

Figure 34:
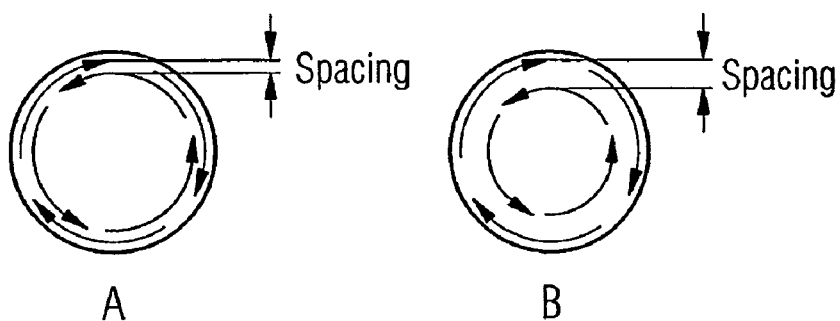
FIGS. 34a and 34b show a spacing achieved with different current pulses of magnetic flows in sensor elements according to the present invention.

Referring to FIG. 34, better PCME sensor performances will be achieved when the spacing between the Counter-Circular "Picky-Back" Field design is narrow (A).

The desired double, counter flow, circular magnetic field structure will be less able to create a close loop structure under torque forces which results in a decreasing secondary sensor signal amplitude.

Figure 35:
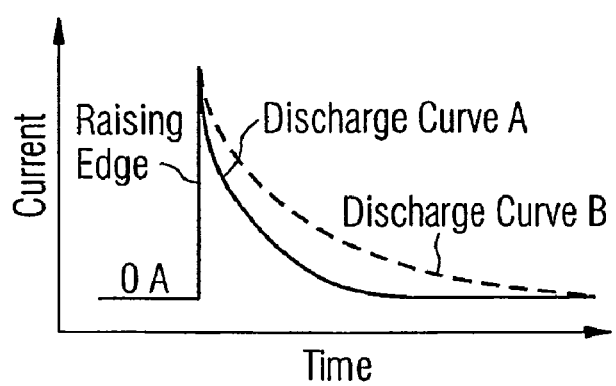
FIG. 35 shows a current versus time diagram of a current pulse as it may be applied to a sensor element according to an exemplary embodiment of the present invention.

Referring to FIG. 35, flattening-out the current-discharge curve will also increase the Sensor-Output Signal-Slope.

When increasing the Current-Pulse discharge time (making the current pulse wider) (B) the Sensor-Output Signal-Slope will increase. However the required amount of current is very high to reduce the slope of the falling edge of the current pulse. It might be more practical to use a combination of a high current amplitude (with the optimal value) and the slowest possible discharge time to achieve the highest possible Sensor-Output Signal Slope.

In the following, Electrical Connection Devices in the frame of Primary Sensor Processing will be described.

The PCME technology (it has to be noted that the term 'PCME' technology is used to refer to exemplary embodiments of the present invention) relies on passing through the shaft very high amounts of pulse-modulated electrical current at the location where the Primary Sensor should be produced. When the surface of the shaft is very clean and highly conductive a multi-point Cupper or Gold connection may be sufficient to achieve the desired sensor signal uniformity. Important is that the Impedance is identical of each connection point to the shaft surface. This can be best achieved when assuring the cable length (L) is identical before it joins the main current connection point (I).

Figure 36:
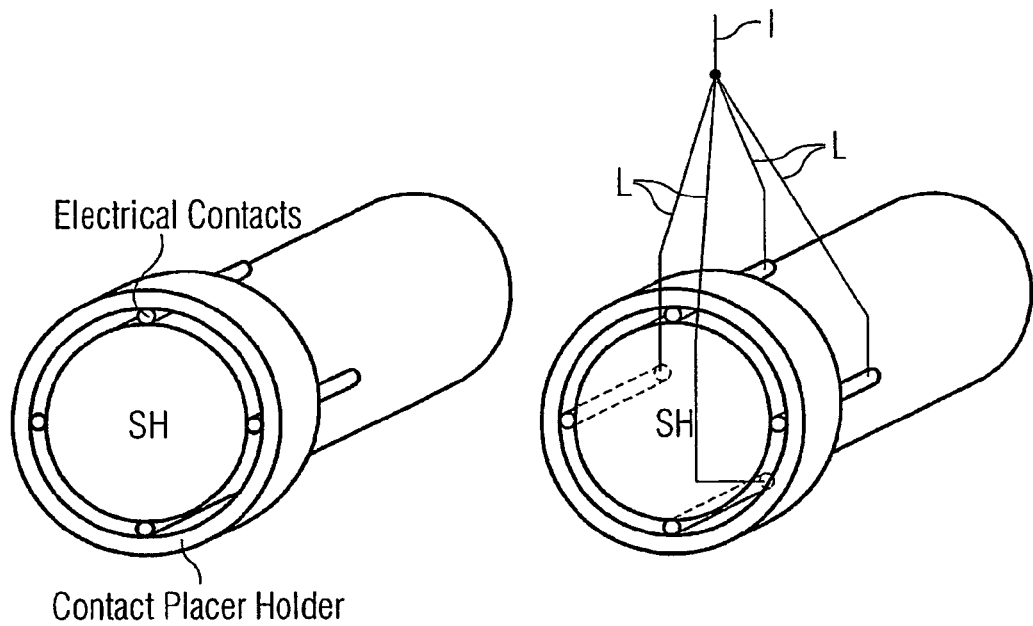
FIG. 36 shows an electrical multi-point connection to a sensor element according to an exemplary embodiment of the present invention.

Referring to FIG. 36, a simple electrical multi-point connection to the shaft surface is illustrated.

However, in most cases a reliable and repeatable multi-point electrical connection can be only achieved by ensuring that the impedance at each connection point is identical and constant. Using a spring pushed, sharpened connector will penetrate possible oxidation or isolation layers (maybe caused by finger prints) at the shaft surface.

Figures 37, 38:
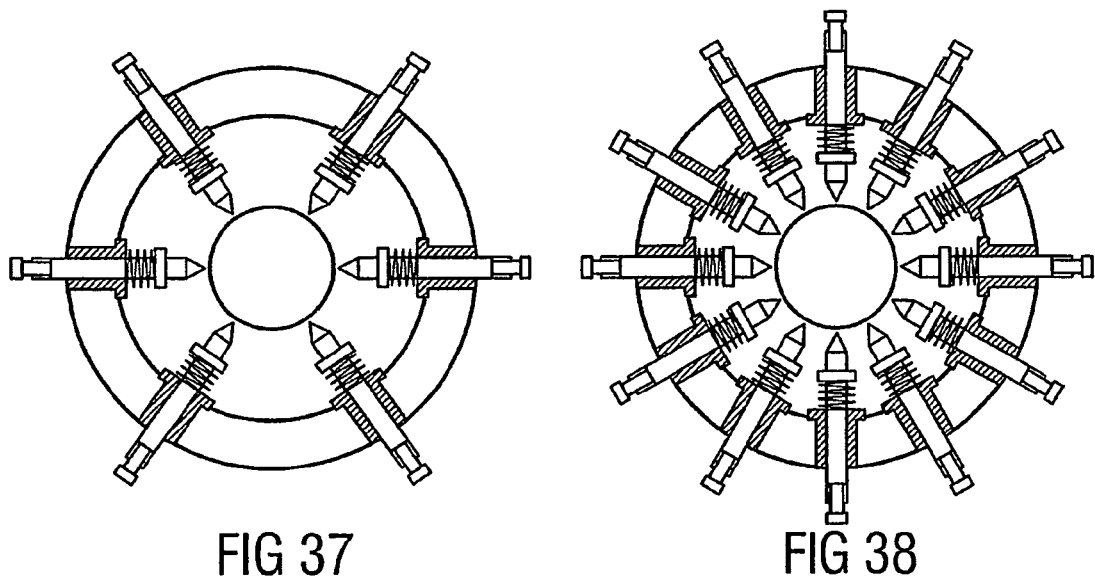
FIG. 37 shows a multi-channel electrical connection fixture with spring loaded contact points to apply a current pulse to the sensor element according to an exemplary embodiment of the present invention.
FIG. 38 shows an electrode system with an increased number of electrical connection points according to an exemplary embodiment of the present invention.

Referring to FIG. 37, a multi channel, electrical connecting fixture, with spring loaded contact points is illustrated.

When processing the shaft it is most important that the electrical current is injected and extracted from the shaft in the most uniform way possible. The above drawing shows several electrical, from each other insulated, connectors that are held by a fixture around the shaft. This device is called a Shaft-Processing-Holding-Clamp (or SPHC). The number of electrical connectors required in a SPHC depends on the shafts outer diameter. The larger the outer diameter, the more connectors are required. The spacing between the electrical conductors has to be identical from one connecting point to the next connecting point. This method is called Symmetrical-"Spot"-Contacts.

Referring to FIG. 38, it is illustrated that increasing the number of electrical connection points will assist the efforts of entering and exiting the Pulse-Modulated electrical current. It will also increase the complexity of the required electronic control system.

Figure 39:
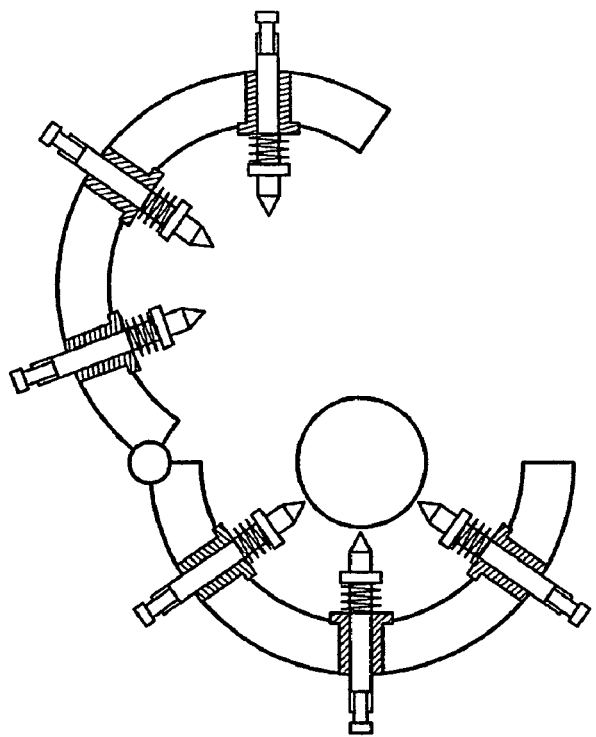
FIG. 39 shows an exemplary embodiment of the electrode system of FIG. 37.

Referring to FIG. 39, an example of how to open the SPHC for easy shaft loading is shown.

In the following, an encoding scheme in the frame of Primary Sensor Processing will be described.

The encoding of the primary shaft can be done by using permanent magnets applied at a rotating shaft or using electric currents passing through the desired section of the shaft. When using permanent magnets a very complex, sequential procedure is necessary to put the two layers of closed loop magnetic fields, on top of each other, in the shaft. When using the PCME procedure the electric current has to enter the shaft and exit the shaft in the most symmetrical way possible to achieve the desired performances.

Figure 40:
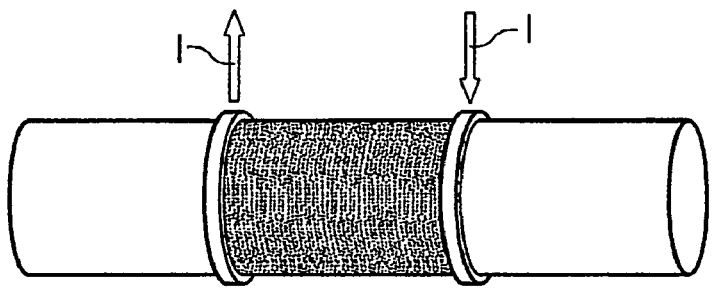
FIG. 40 shows shaft processing holding clamps used for a method according to an exemplary embodiment of the present invention.

Referring to FIG. 40, two SPHCs (Shaft Processing Holding Clamps) are placed at the borders of the planned sensing encoding region. Through one SPHC the pulsed electrical current (I) will enter the shaft, while at the second SPHC the pulsed electrical current (I) will exit the shaft. The region between the two SPHCs will then turn into the primary sensor.

This particular sensor process will produce a Single Field (SF) encoded region. One benefit of this design (in comparison to those that are described below) is that this design is insensitive to any axial shaft movements in relation to the location of the secondary sensor devices. The disadvantage of this design is that when using axial (or in-line) placed MFS coils the system will be sensitive to magnetic stray fields (like the earth magnetic field).

Figure 41:
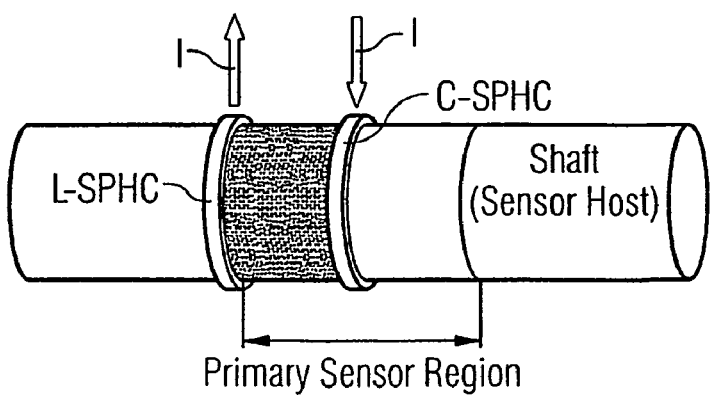
FIG. 41 shows a dual field encoding region of a sensor element according to the present invention.

Referring to FIG. 41, a Dual Field (DF) encoded region (meaning two independent functioning sensor regions with opposite polarity, side-by-side) allows cancelling the effects of uniform magnetic stray fields when using axial (or in-line) placed MFS coils. However, this primary sensor design also shortens the tolerable range of shaft movement in axial direction (in relation to the location of the MFS coils). There are two ways to produce a Dual Field (DF) encoded region with the PCME technology. The sequential process, where the magnetic encoded sections are produced one after each other, and the parallel process, where both magnetic encoded sections are produced at the same time.

The first process step of the sequential dual field design is to magnetically encode one sensor section (identically to the Single Field procedure), whereby the spacing between the two SPHC has to be halve of the desired final length of the Primary Sensor region. To simplify the explanations of this process we call the SPHC that is placed in the centre of the final Primary Sensor Region the Centre SPHC (C-SPHC), and the SPHC that is located at the left side of the Centre SPHC: L-SPHC.

Figure 42:
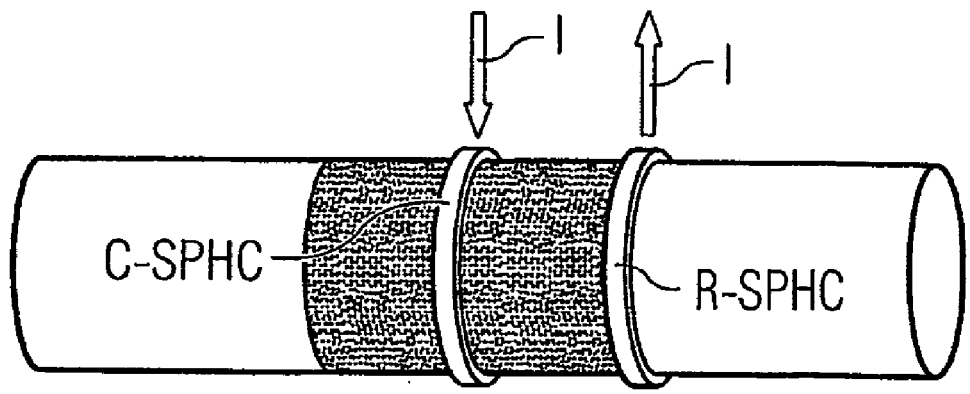
FIG. 42 shows a process step of a sequential dual field encoding according to an exemplary embodiment of the present invention.

Referring to FIG. 42, the second process step of the sequential Dual Field encoding will use the SPHC that is located in the centre of the Primary Sensor region (called C-SPHC) and a second SPHC that is placed at the other side (the right side) of the centre SPHC, called R-SPHC. Important is that the current flow direction in the centre SPHC (C-SPHC) is identical at both process steps.

Figure 43:
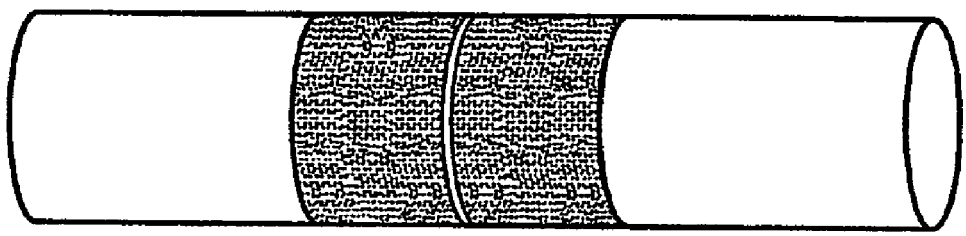
FIG. 43 shows another process step of the dual field encoding according to another exemplary embodiment of the present invention.

Referring to FIG. 43, the performance of the final Primary Sensor Region depends on how close the two encoded regions can be placed in relation to each other. And this is dependent on the design of the used centre SPHC. The narrower the in-line space contact dimensions are of the C-SPHC, the better are the performances of the Dual Field PCME sensor.

Figure 44:
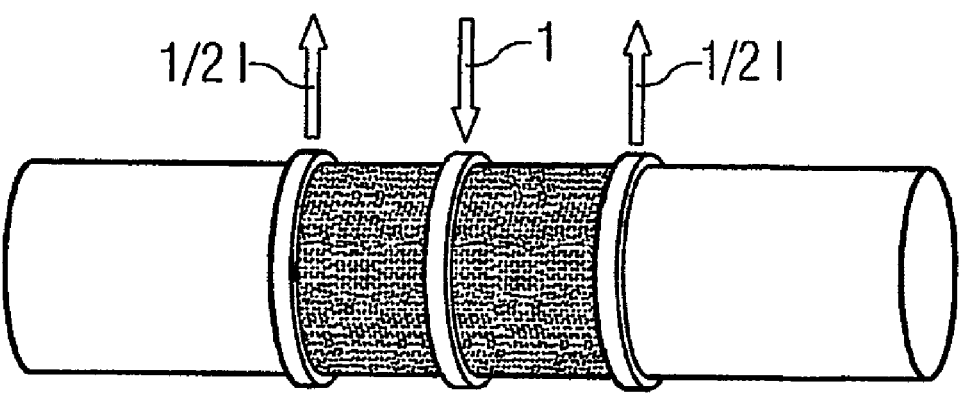
FIG. 44 shows another exemplary embodiment of a sensor element with an illustration of a current pulse application according to another exemplary embodiment of the present invention.

FIG. 44 shows the pulse application according to another exemplary embodiment of the present invention. As my be taken from the above drawing, the pulse is applied to three locations of the shaft. Due to the current distribution to both sides of the middle electrode where the current I is entered into the shaft, the current leaving the shaft at the lateral electrodes is only half the current entered at the middle electrode, namely ½ I. The electrodes are depicted as rings which dimensions are adapted to the dimensions of the outer surface of the shaft. However, it has to be noted that other electrodes may be used, such as the electrodes comprising a plurality of pin electrodes described later in this text.

Figure 45:
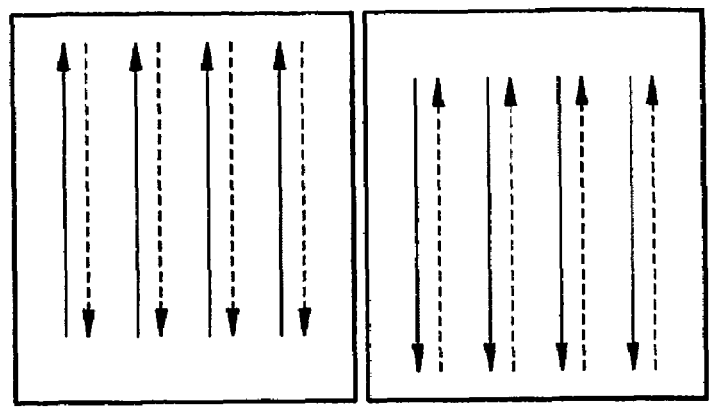
FIG. 45 shows schematic diagrams for describing magnetic flux directions in sensor elements according to the present invention when no stress is applied.

Referring to FIG. 45, magnetic flux directions of the two sensor sections of a Dual Field PCME sensor design are shown when no torque or linear motion stress is applied to the shaft. The counter flow magnetic flux loops do not interact with each other.

Figure 46:
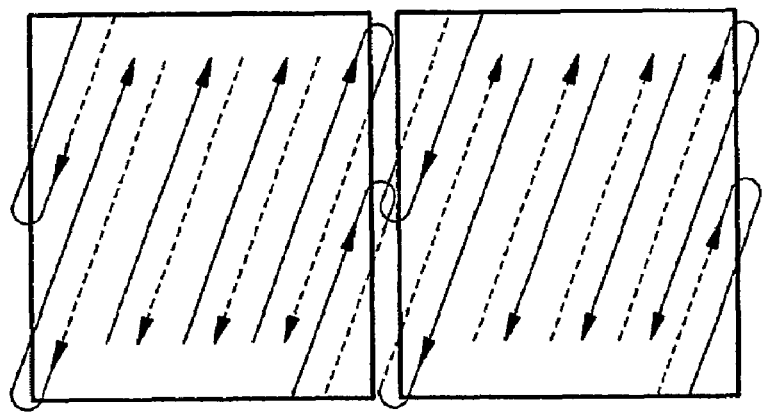
FIG. 46 shows magnetic flux directions of the sensor element of FIG. 45 when a force is applied.

Referring to FIG. 46, when torque forces or linear stress forces are applied in a particular direction then the magnetic flux loops begin to run with an increasing tilting angle inside the shaft. When the tilted magnetic flux reaches the PCME segment boundary then the flux line interacts with the counterflowing magnetic flux lines, as shown.

Figure 47:
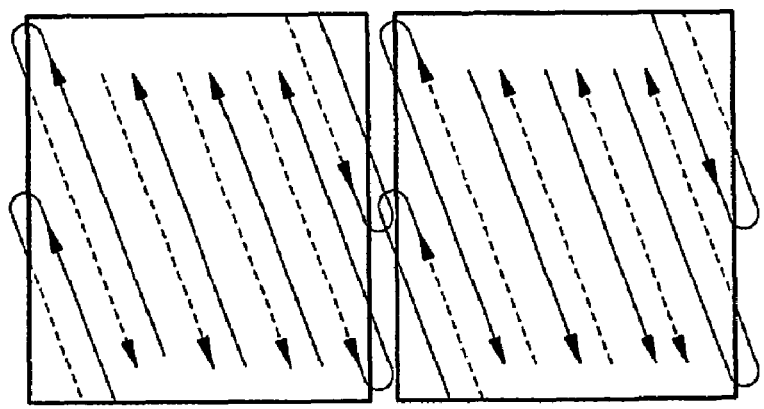
FIG. 47 shows the magnetic flux inside the PCM encoded shaft of FIG. 45 when the applied torque direction is changing.

Referring to FIG. 47, when the applied torque direction is changing (for example from clock-wise to counter-clockwise) so will change the tilting angle of the counterflow magnetic flux structures inside the PCM Encoded shaft.

In the following, a Multi Channel Current Driver for Shaft Processing will be described.

In cases where an absolute identical impedance of the current path to the shaft surface can not be guaranteed, then electric current controlled driver stages can be used to overcome this problem.

Figure 48:
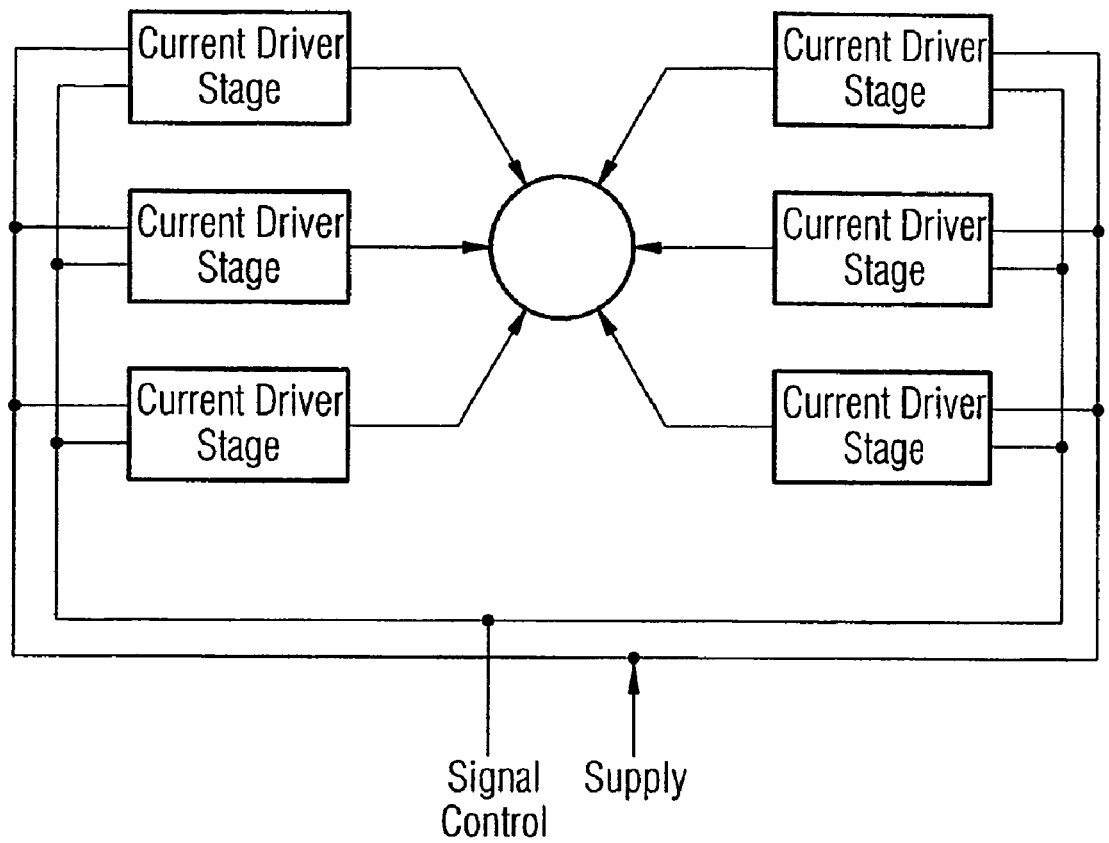
FIG. 48 shows a 6-channel synchronized pulse current driver system according to an exemplary embodiment of the present invention.

Referring to FIG. 48, a six-channel synchronized Pulse current driver system for small diameter Sensor Hosts (SH) is shown. As the shaft diameter increases so will the number of current driver channels.

In the following, Bras Ring Contacts and Symmetrical "Spot" Contacts will be described.

When the shaft diameter is relative small and the shaft surface is clean and free from any oxidations at the desired Sensing Region, then a simple "Bras"-ring (or Copper-ring) contact method can be chosen to process the Primary Sensor.

Figure 49:
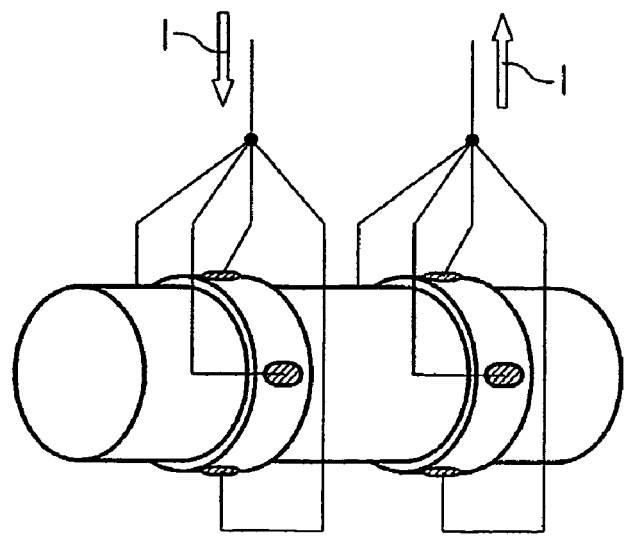
FIG. 49 shows a simplified representation of an electrode system according to another exemplary embodiment of the present invention.

Referring to FIG. 49, bras-rings (or Copper-rings) tightly fitted to the shaft surface may be used, with solder connections for the electrical wires. The area between the two Bras-rings (Copper-rings) is the encoded region.

However, it is very likely that the achievable RSU performances are much lower then when using the Symmetrical "Spot" Contact method.

In the following, a Hot-Spotting concept will be described.

A standard single field (SF) PCME sensor has very poor Hot-Spotting performances. The external magnetic flux profile of the SF PCME sensor segment (when torque is applied) is very sensitive to possible changes (in relation to Ferro magnetic material) in the nearby environment. As the magnetic boundaries of the SF encoded sensor segment are not well defined (not "Pinned Down") they can "extend" towards the direction where Ferro magnet material is placed near the PCME sensing region.

Figure 50:
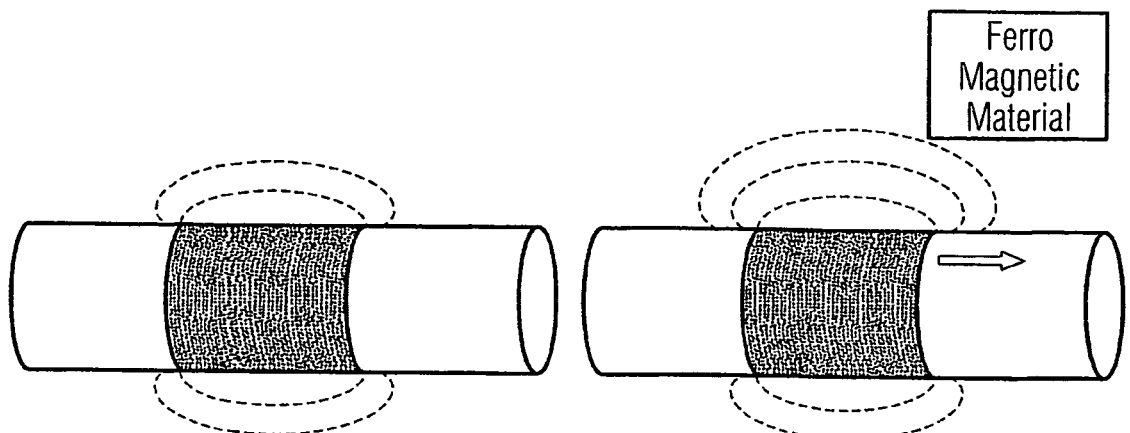
FIG. 50 is a representation of a sensor element according to an exemplary embodiment of the present invention.

Referring to FIG. 50, a PCME process magnetized sensing region is very sensitive to Ferro magnetic materials that may come close to the boundaries of the sensing regions.

To reduce the Hot-Spotting sensor sensitivity the PCME sensor segment boundaries have to be better defined by pinning them down (they can no longer move).

Figure 51:
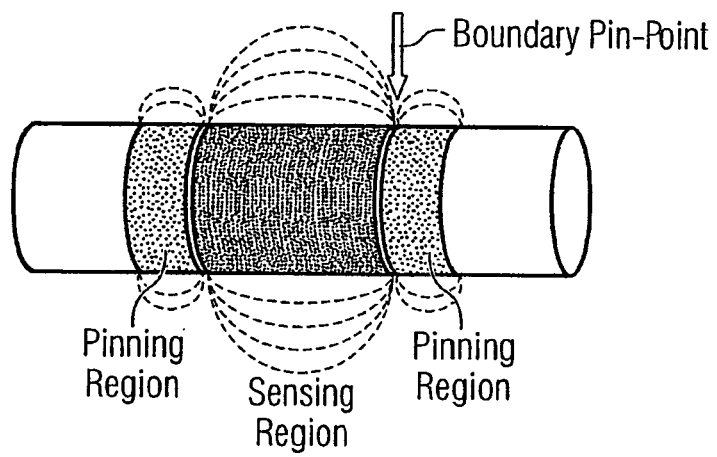
FIG. 51 is another exemplary embodiment of a sensor element according to the present invention having a PCME process sensing region with two pinning field regions.

Referring to FIG. 51, a PCME processed Sensing region with two "Pinning Field Regions" is shown, one on each side of the Sensing Region.

By placing Pinning Regions closely on either side the Sensing Region, the Sensing Region Boundary has been pinned down to a very specific location. When Ferro magnetic material is coming close to the Sensing Region, it may have an effect on the outer boundaries of the Pinning Regions, but it will have very limited effects on the Sensing Region Boundaries.

There are a number of different ways, according to exemplary embodiments of the present invention how the SH (Sensor Host) can be processed to get a Single Field (SF) Sensing Region and two Pinning Regions, one on each side of the Sensing Region. Either each region is processed after each other (Sequential Processing) or two or three regions are processed simultaneously (Parallel Processing). The Parallel Processing provides a more uniform sensor (reduced parasitic fields) but requires much higher levels of electrical current to get to the targeted sensor signal slope.

Figure 52:
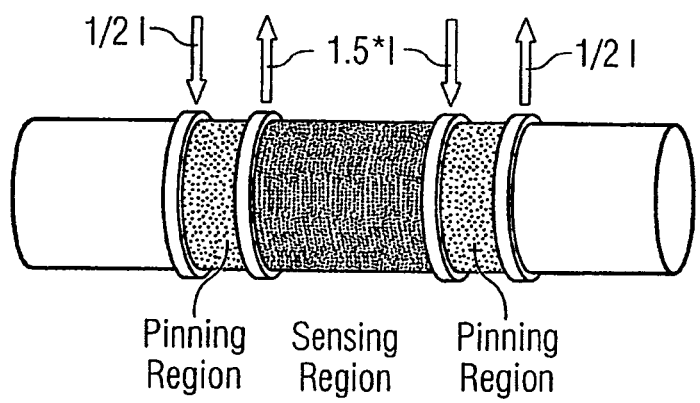
FIG. 52 is a schematic representation for explaining a manufacturing method according to an exemplary embodiment of the present invention for manufacturing a sensor element with an encoded region and pinning regions.

Referring to FIG. 52, a parallel processing example for a Single Field (SF) PCME sensor with Pinning Regions on either side of the main sensing region is illustrated, in order to reduce (or even eliminate) Hot-Spotting.

A Dual Field PCME Sensor is less sensitive to the effects of Hot-Spotting as the sensor centre region is already Pinned-Down. However, the remaining Hot-Spotting sensitivity can be further reduced by placing Pinning Regions on either side of the Dual-Field Sensor Region.

Figure 53:
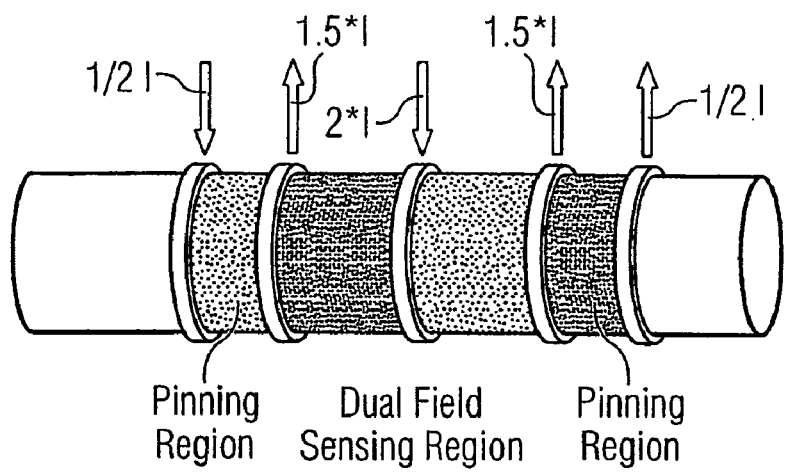
FIG. 53 is another schematic representation of a sensor element according to an exemplary embodiment of the present invention manufactured in accordance with a manufacturing method according to an exemplary embodiment of the present invention.

Referring to FIG. 53, a Dual Field (DF) PCME sensor with Pinning Regions either side is shown.

When Pinning Regions are not allowed or possible (example: limited axial spacing available) then the Sensing Region has to be magnetically shielded from the influences of external Ferro Magnetic Materials.

In the following, the Rotational Signal Uniformity (RSU) will be explained.

The RSU sensor performance are, according to current understanding, mainly depending on how circumferentially uniform the electrical current entered and exited the SH surface, and the physical space between the electrical current entry and exit points. The larger the spacing between the current entry and exit points, the better is the RSU performance.

Figure 54:
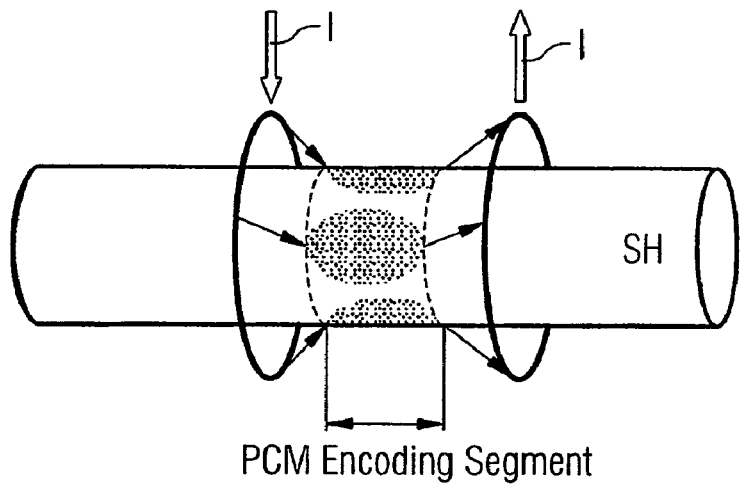
FIG. 54 is a simplified schematic representation for further explaining an exemplary embodiment of the present invention.

Referring to FIG. 54, when the spacings between the individual circumferential placed current entry points are relatively large in relation to the shaft diameter (and equally large are the spacings between the circumferentially placed current exit points) then this will result in very poor RSU performances. In such a case the length of the PCM Encoding Segment has to be as large as possible as otherwise the created magnetic field will be circumferentially non-uniform.

Figure 55:
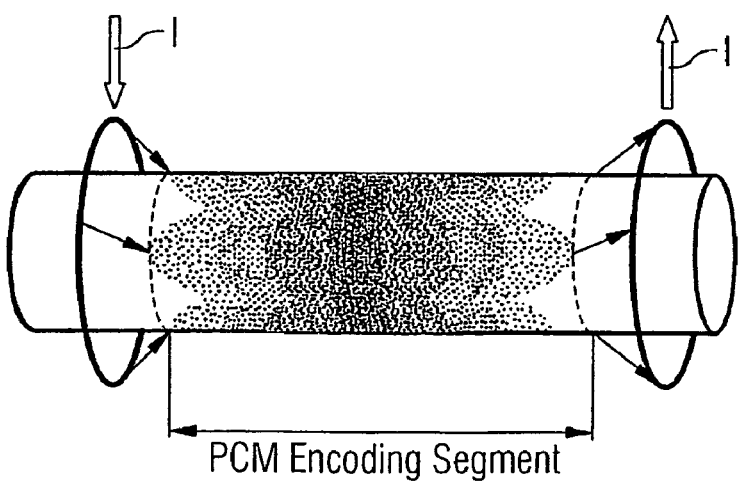
FIG. 55 is another simplified schematic representation for further explaining an exemplary embodiment of the present invention.

Referring to FIG. 55, by widening the PCM Encoding Segment the circumferentially magnetic field distribution will become more uniform (and eventually almost perfect) at the halve distance between the current entry and current exit points. Therefore the RSU performance of the PCME sensor is best at the halve way-point between of the current-entry/current-exit points.

Next, the basic design issues of a NCT sensor system will be described.

Without going into the specific details of the PCM-Encoding technology, the end-user of this sensing technology need to now some design details that will allow him to apply and to use this sensing concept in his application. The following pages describe the basic elements of a magnetostriction based NCT sensor (like the primary sensor, secondary sensor, and the SCSP electronics), what the individual components look like, and what choices need to be made when integrating this technology into an already existing product.

In principle the PCME sensing technology can be used to produce a stand-alone sensor product. However, in already existing industrial applications there is little to none space available for a "stand-alone" product. The PCME technology can be applied in an existing product without the need of redesigning the final product.

In case a stand-alone torque sensor device or position detecting sensor device will be applied to a motor-transmission system it may require that the entire system need to undergo a major design change.

In the following, referring to FIG. 56, a possible location of a PCME sensor at the shaft of an engine is illustrated.

Figure 56:
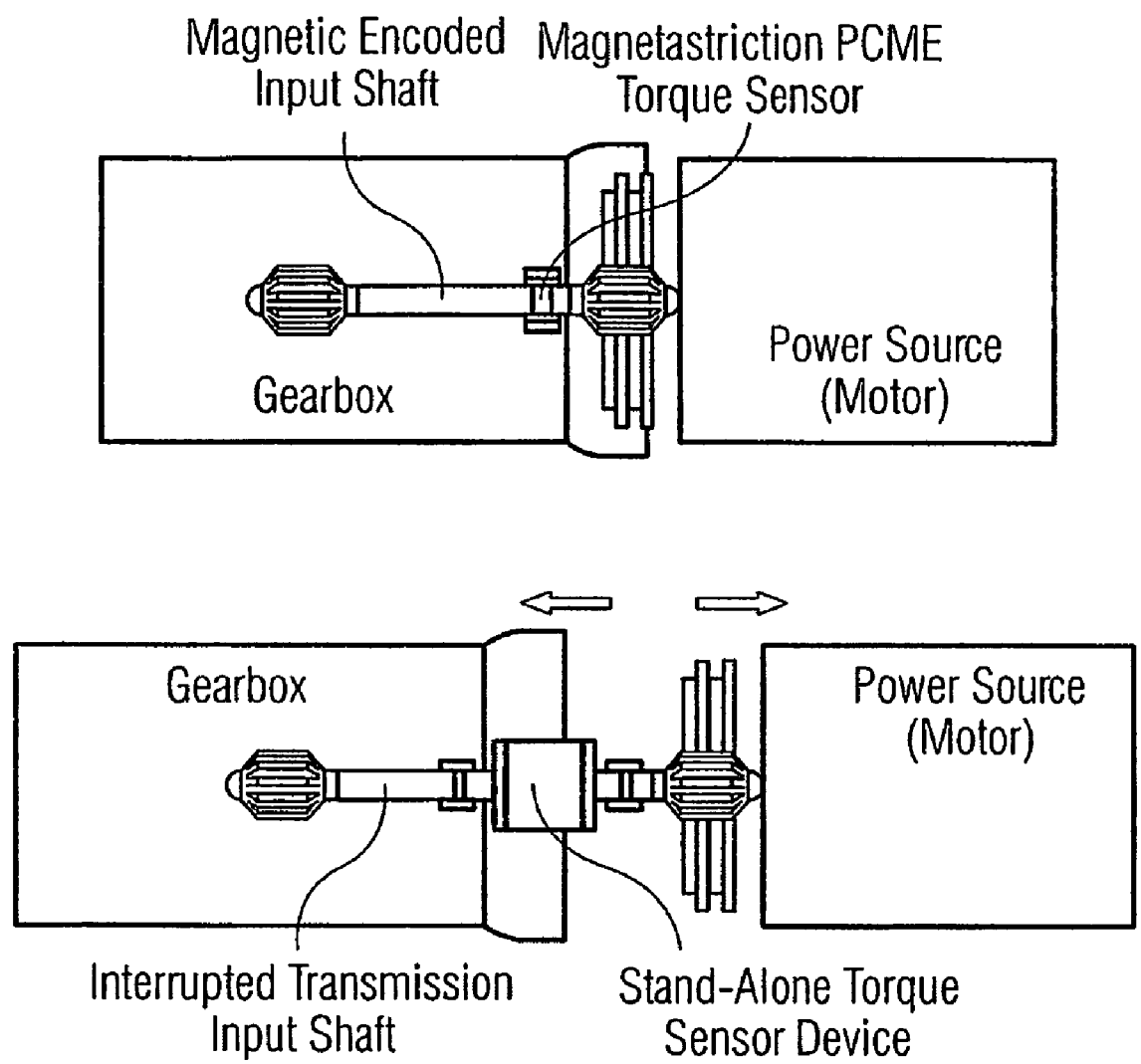
FIG. 56 shows an application of a torque sensor according to an exemplary embodiment of the present invention in a gear box of a motor.

FIG. 56 shows possible arrangement locations for the torque sensor according to an exemplary embodiment of the present invention, for example, in a gear box of a motorcar. The upper portion of FIG. 56 shows the arrangement of the PCME torque sensor according to an exemplary embodiment of the present invention. The lower portion of the FIG. 56 shows the arrangement of a stand alone sensor device which is not integrated in the input shaft of the gear box as is in the exemplary embodiment of the present invention.

As may be taken from the upper portion of FIG. 56, the torque sensor according to an exemplary embodiment of the present invention may be integrated into the input shaft of the gear box. In other words, the primary sensor may be a portion of the input shaft. In other words, the input shaft may be magnetically encoded such that it becomes the primary sensor or sensor element itself. The secondary sensors, i.e. the coils, may, for example, be accommodated in a bearing portion close to the encoded region of the input shaft. Due to this, for providing the torque sensor between the power source and the gear box, it is not necessary to interrupt the input shaft and to provide a separate torque sensor in between a shaft going to the motor and another shaft going to the gear box as shown in the lower portion of FIG. 56.

Due to the integration of the encoded region in the input shaft it is possible to provide for a torque sensor without making any alterations to the input shaft, for example, for a car. This becomes very important, for example, in parts for an aircraft where each part has to undergo extensive tests before being allowed for use in the aircraft. Such torque sensor according to the present invention may be perhaps even without such extensive testing being corporated in shafts in aircraft or turbine since, the immediate shaft is not altered. Also, no material effects are caused to the material of the shaft.

Furthermore, as may be taken from FIG. 56, the torque sensor according to an exemplary embodiment of the present invention may allow to reduce a distance between a gear box and a power source since the provision of a separate stand alone torque sensor between the shaft exiting the power source and the input shaft to the gear box becomes obvious.

Next, Sensor Components will be explained.

Figure 57:
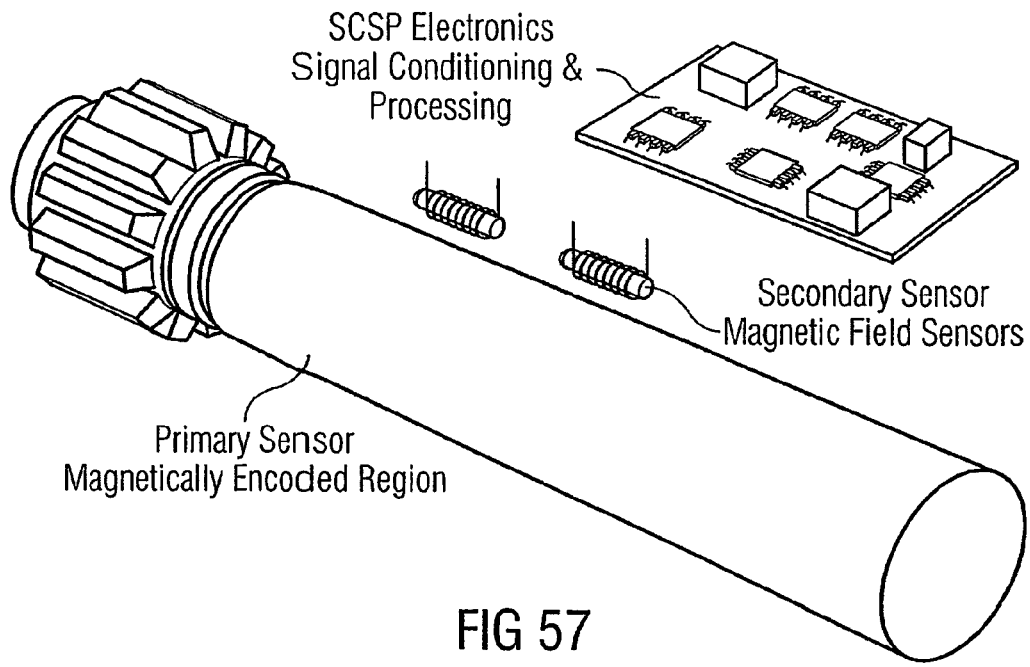
FIG. 57 shows a torque sensor according to an exemplary embodiment of the present invention.

A non-contact magnetostriction sensor (NCT-Sensor), as shown in FIG. 57, may consist, according to an exemplary embodiment of the present invention, of three main functional elements: The Primary Sensor, the Secondary Sensor, and the Signal Conditioning & Signal Processing (SCSP) electronics.

Depending on the application type (volume and quality demands, targeted manufacturing cost, manufacturing process flow) the customer can chose to purchase either the individual components to build the sensor system under his own management, or can subcontract the production of the individual modules.

Figure 58:
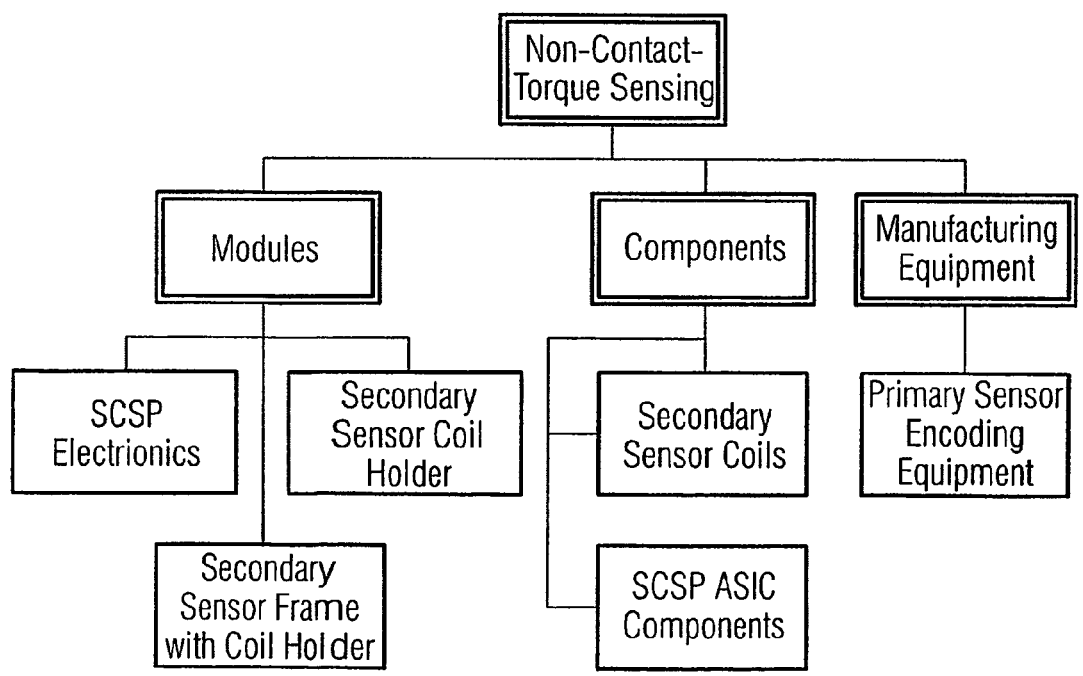
FIG. 58 shows a schematic illustration of components of a non-contact torque sensing device according to an exemplary embodiment of the present invention.

FIG. 58 shows a schematic illustration of components of a non-contact torque sensing device. However, these components can also be implemented in a non-contact position sensing device.

In cases where the annual production target is in the thousands of units it may be more efficient to integrate the "primary-sensor magnetic-encoding-process" into the customers manufacturing process. In such a case the customer needs to purchase application specific "magnetic encoding equipment".

In high volume applications, where cost and the integrity of the manufacturing process are critical, it is typical that NCTE supplies only the individual basic components and equipment necessary to build a non-contact sensor:
  ICs (surface mount packaged, Application-Specific Electronic Circuits)
  MFS-Coils (as part of the Secondary Sensor)
  Sensor Host Encoding Equipment (to apply the magnetic encoding on the shaft=Primary Sensor)

Depending on the required volume, the MFS-Coils can be supplied already assembled on a frame, and if desired, electrically attached to a wire harness with connector. Equally the SCSP (Signal Conditioning & Signal Processing) electronics can be supplied fully functional in PCB format, with or without the MFS-Coils embedded in the PCB.

Figure 59:
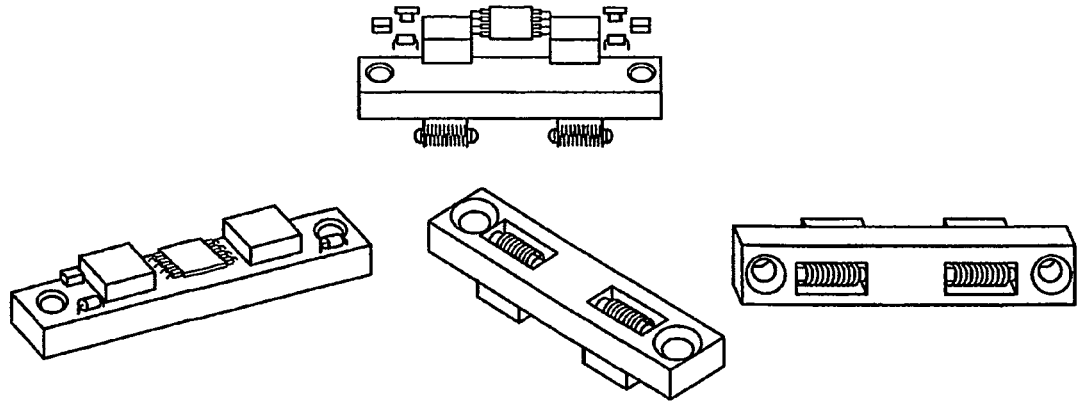
FIG. 59 shows components of a sensing device according to an exemplary embodiment of the present invention.

FIG. 59 shows components of a sensing device.

Figure 60:
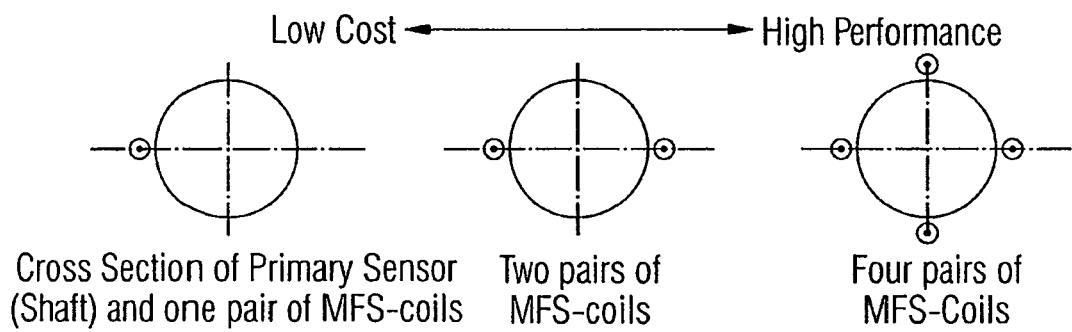
FIG. 60 shows arrangements of coils with a sensor element according to an exemplary embodiment of the present invention.

As can be seen from FIG. 60, the number of required MFS-coils is dependent on the expected sensor performance and the mechanical tolerances of the physical sensor design. In a well designed sensor system with perfect Sensor Host (SH or magnetically encoded shaft) and minimal interferences from unwanted magnetic stray fields, only 2 MFS-coils are needed. However, if the SH is moving radial or axial in relation to the secondary sensor position by more than a few tenths of a millimeter, then the number of MFS-coils need to be increased to achieve the desired sensor performance.

In the following, a control and/or evaluation circuitry will be explained.

The SCSP electronics, according to an exemplary embodiment of the present invention, consist of the NCTE specific ICs, a number of external passive and active electronic circuits, the printed circuit board (PCB), and the SCSP housing or casing. Depending on the environment where the SCSP unit will be used the casing has to be sealed appropriately.

Depending on the application specific requirements NCTE (according to an exemplary embodiment of the present invention) offers a number of different application specific circuits:
  Basic Circuit
  Basic Circuit with integrated Voltage Regulator
  High Signal Bandwidth Circuit
  Optional High Voltage and Short Circuit Protection Device Optional Fault Detection Circuit FIG. 61 shows a single channel, low cost sensor electronics solution.

Figure 61:
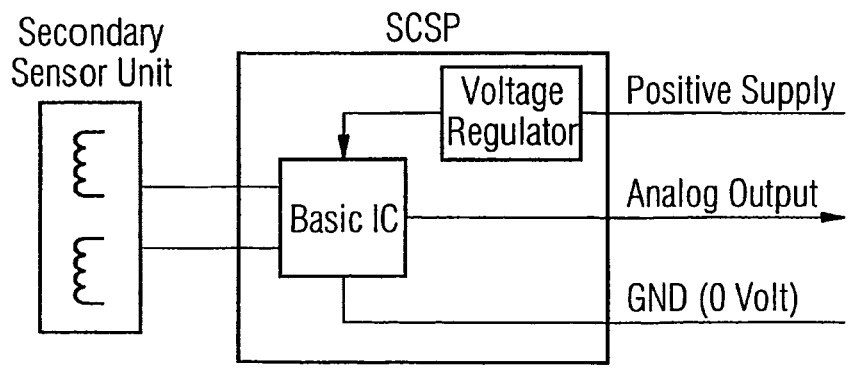
FIG. 61 shows a single channel sensor electronics according to an exemplary embodiment of the present invention.

As may be taken from FIG. 61, there may be provided a secondary sensor unit which comprises, for example, coils. These coils are arranged as, for example, shown in FIG. 60 for sensing variations in a magnetic field emitted from the primary sensor unit, i.e. the sensor shaft or sensor element when torque is applied thereto. The secondary sensor unit is connected to a basis IC in a SCST. The basic IC is connected via a voltage regulator to a positive supply voltage. The basic IC is also connected to ground. The basic IC is adapted to provide an analog output to the outside of the SCST which output corresponds to the variation of the magnetic field caused by the stress applied to the sensor element.

Figure 62:
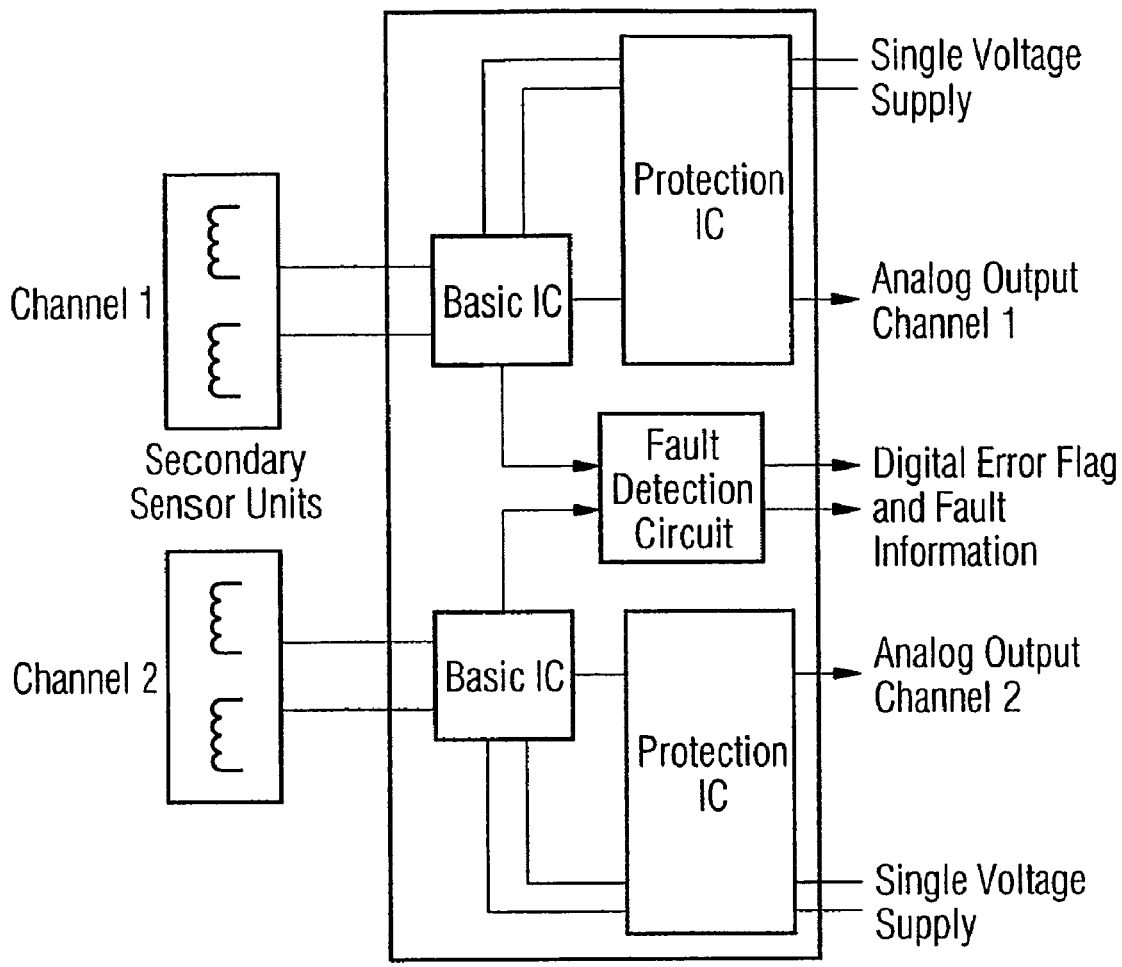
FIG. 62 shows a dual channel, short circuit protected system according to an exemplary embodiment of the present invention.

FIG. 62 shows a dual channel, short circuit protected system design with integrated fault detection. This design consists of 5 ASIC devices and provides a high degree of system safety. The Fault-Detection IC identifies when there is a wire breakage anywhere in the sensor system, a fault with the MFS coils, or a fault in the electronic driver stages of the "Basic IC".

Next, the Secondary Sensor Unit will be explained.

Figure 63:
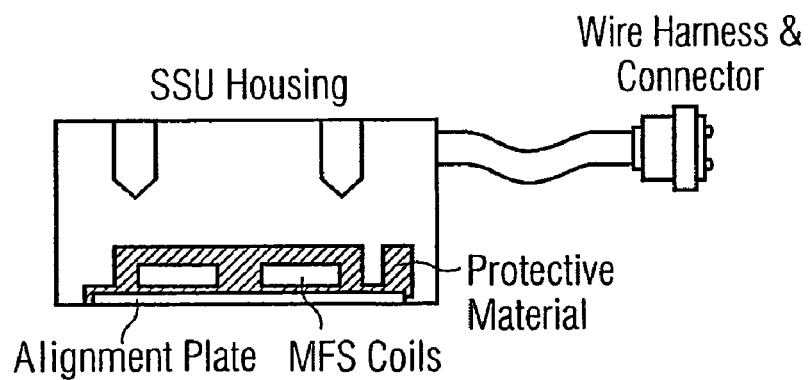
FIG. 63 shows a sensor according to another exemplary embodiment of the present invention.

The Secondary Sensor may, according to one embodiment shown in FIG. 63, consist of the elements: One to eight MFS (Magnetic Field Sensor) Coils, the Alignment- & Connection-Plate, the wire harness with connector, and the Secondary-Sensor-Housing.

The MFS-coils may be mounted onto the Alignment-Plate. Usually the Alignment-Plate allows that the two connection wires of each MFS-Coil are soldered/connected in the appropriate way. The wire harness is connected to the alignment plate. This, completely assembled with the MFS-Coils and wire harness, is then embedded or held by the Secondary-Sensor-Housing.

The main element of the MFS-Coil is the core wire, which has to be made out of an amorphous-like material.

Depending on the environment where the Secondary-Sensor-Unit will be used, the assembled Alignment Plate has to be covered by protective material. This material can not cause mechanical stress or pressure on the MFS-coils when the ambient temperature is changing.

In applications where the operating temperature will not exceed +110 deg C. the customer has the option to place the SCSP electronics (ASIC) inside the secondary sensor unit (SSU). While the ASIC devices can operated at temperatures above +125 deg C. it will become increasingly more difficult to compensate the temperature related signal-offset and signal-gain changes.

The recommended maximal cable length between the MFS-coils and the SCSP electronics is 2 meters. When using the appropriate connecting cable, distances of up to 10 meters are achievable. To avoid signal-cross-talk in multi-channel applications (two independent SSUs operating at the same Primary Sensor location=Redundant Sensor Function), specially shielded cable between the SSUs and the SCSP Electronics should be considered.

When planning to produce the Secondary-Sensor-Unit (SSU) the producer has to decide which part/parts of the SSU have to be purchased through subcontracting and which manufacturing steps will be made in-house.

In the following, Secondary Sensor Unit Manufacturing Options will be described.

When integrating the NCT-Sensor into a customized tool or standard transmission system then the systems manufacturer has several options to choose from:

custom made SSU (including the wire harness and connector)

selected modules or components; the final SSU assembly and system test may be done under the customer's management.

only the essential components (MFS-coils or MFS-core-wire, Application specific ICs) and will produce the SSU in-house.

Figure 64:
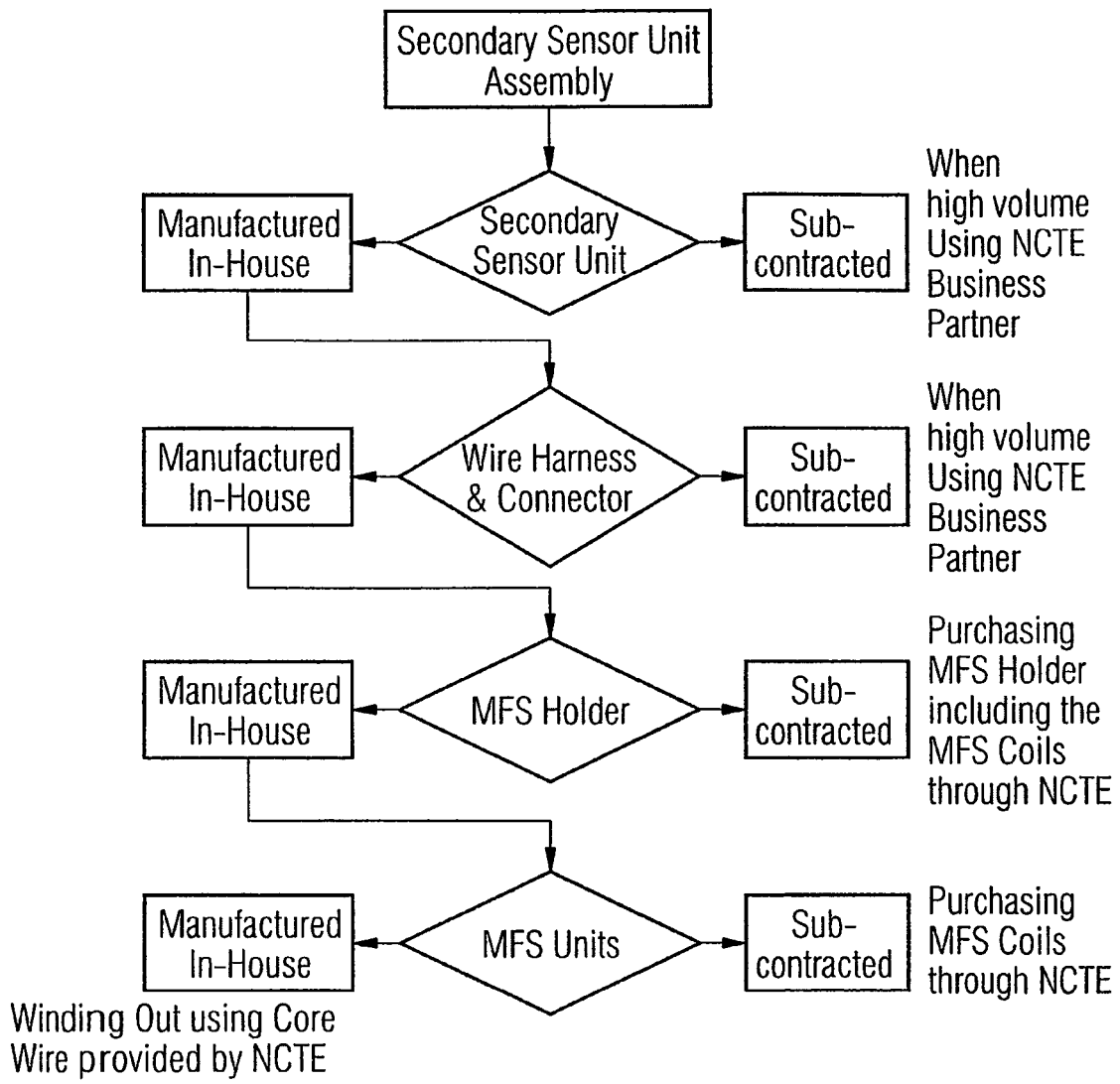
FIG. 64 illustrates an exemplary embodiment of a secondary sensor unit assembly according to an exemplary embodiment of the present invention.

FIG. 64 illustrates an exemplary embodiment of a Secondary Sensor Unit Assembly.

Next, a Primary Sensor Design is explained.

The SSU (Secondary Sensor Units) can be placed outside the magnetically encoded SH (Sensor Host) or, in case the SH is hollow, inside the SH. The achievable sensor signal amplitude is of equal strength but has a much better signal-to-noise performance when placed inside the hollow shaft.

Figure 65:
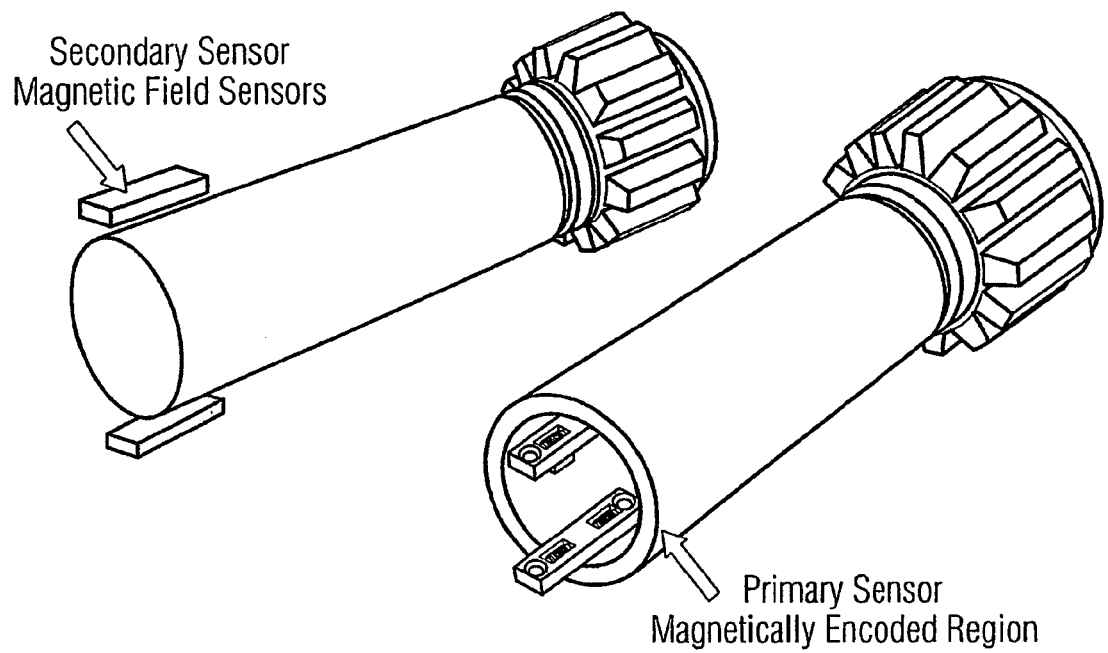
FIG. 65 illustrates two configurations of a geometrical arrangement of primary sensor and secondary sensor according to an exemplary embodiment of the present invention.

FIG. 65 illustrates two configurations of the geometrical arrangement of Primary Sensor and Secondary Sensor.

Improved sensor performances may be achieved when the magnetic encoding process is applied to a straight and parallel section of the SH (shaft). For a shaft with 15 mm to 25 mm diameter the optimal minimum length of the Magnetically Encoded Region is 25 mm. The sensor performances will further improve if the region can be made as long as 45 mm (adding Guard Regions). In complex and highly integrated transmission (gearbox) systems it will be difficult to find such space. Under more ideal circumstances, the Magnetically Encoding Region can be as short as 14 mm, but this bears the risk that not all of the desired sensor performances can be achieved.

Figure 66:
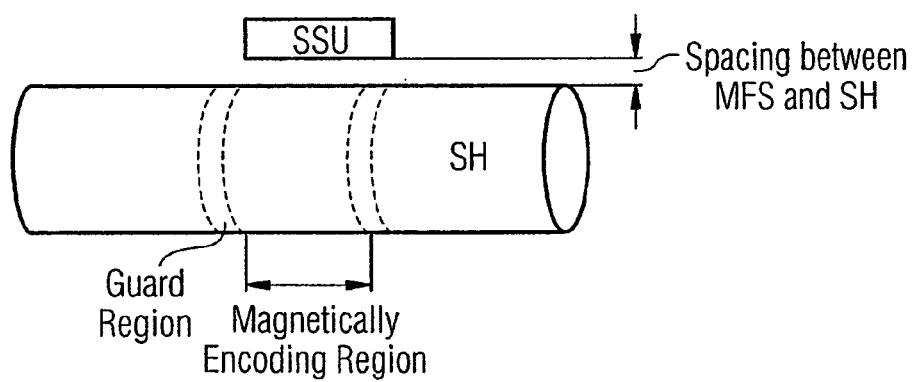
FIG. 66 is a schematic representation for explaining that a spacing between the secondary sensor unit and the sensor host is preferably as small as possible.

As illustrated in FIG. 66, the spacing between the SSU (Secondary Sensor Unit) and the Sensor Host surface, according to an exemplary embodiment of the present invention, should be held as small as possible to achieve the best possible signal quality.

Next, the Primary Sensor Encoding Equipment will be described.

Figure 67:
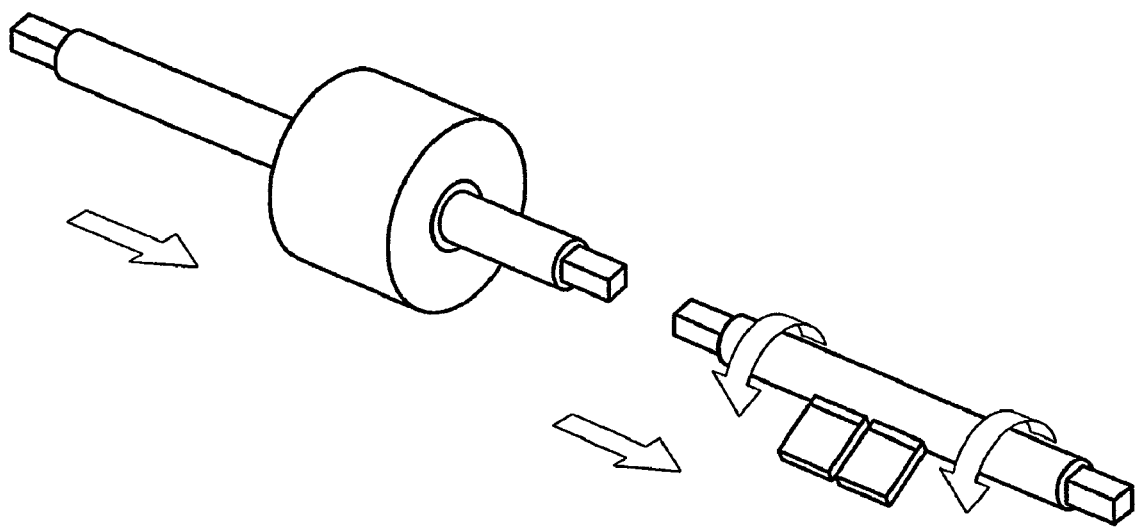
FIG. 67 is an embodiment showing a primary sensor encoding equipment.

An example is shown in FIG. 67.

Depending on which magnetostriction sensing technology will be chosen, the Sensor Host (SH) needs to be processed and treated accordingly. The technologies vary by a great deal from each other (ABB, FAST, FT, Kubota, MDI, NCTE, RM, Siemens, . . . ) and so does the processing equipment required. Some of the available magnetostriction sensing technologies do not need any physical changes to be made on the SH and rely only on magnetic processing (MDI, FAST, NCTE).

While the MDI technology is a two phase process, the FAST technology is a three phase process, and the NCTE technology a one phase process, called PCM Encoding.

One should be aware that after the magnetic processing, the Sensor Host (SH or Shaft), has become a "precision measurement" device and has to be treated accordingly. The magnetic processing should be the very last step before the treated SH is carefully placed in its final location.

The magnetic processing should be an integral part of the customer's production process (in-house magnetic processing) under the following circumstances:

High production quantities (like in the thousands)

Heavy or difficult to handle SH (e.g. high shipping costs)

Very specific quality and inspection demands (e.g. defense applications)

In all other cases it may be more cost effective to get the SH magnetically treated by a qualified and authorized subcontractor, such as NCTE. For the "in-house" magnetic processing dedicated manufacturing equipment is required. Such equipment can be operated fully manually, semi-automated, and fully automated. Depending on the complexity and automation level the equipment can cost anywhere from EUR 20 k to above EUR 500 k.

It should be noted that the term "comprising" does not exclude other elements or steps and the "a" or "an" does not exclude a plurality. Also elements described in association with different embodiments may be combined.

The invention claimed is:

1. A torque sensor, comprising:
a sensor element,
wherein the sensor element is manufactured by applying a first current pulse to the sensor element, the first current pulse being applied in such a manner that there is a first current flow in a first direction along a longitudinal axis of the sensor element; and
wherein the first current pulse is such that the application of the first current pulse generates a magnetically encoded region in the sensor element,
wherein a second current pulse is applied to the sensor element; and
wherein the second current pulse is applied in such a manner that there is a second current flow in a second direction along the longitudinal axis of the sensor element;
wherein the sensor element has a circumferential surface surrounding a core region of the sensor element;
wherein the first current pulse is introduced into the sensor element at a first location at the circumferential surface such that there is the first current flow in the first direction in the core region of the sensor element;
wherein the first current pulse is discharged from the sensor element at a second location at the circumferential surface; and
wherein the second location is at a distance in the first direction from the first location
wherein the first current pulse is applied using an electrode system having at least a first electrode and a second electrode; and
wherein the first electrode is located at the first location and the second electrode is located at the second location
wherein each of the first and second electrodes has a plurality of electrode pins; and
wherein the plurality of electrode pins of each of the first and second electrodes are arranged circumferentially around the sensor element such that the sensor element is contacted by the electrode pins of the first and second electrodes at a plurality of contact points at an outer circumferential surface of the shaft at the first and second locations.

2. The torque sensor of claim 1,
wherein each of the first and second current pulses has a raising edge and a falling edge; and
wherein the raising edge is steeper than the falling edge.

3. The torque sensor of claim 2, wherein a first duration of the first current pulse is significant longer than a second duration of the second current pulse.

4. The torque sensor of claim 3,
wherein the first duration is smaller than 300 ms; and
wherein the second duration is larger than 300 ms.

5. The torque sensor of claim 3,
wherein the first duration is smaller than 200 ms; and
wherein the second duration is larger than 400 ms.

6. The torque sensor of claim 3,
wherein the first duration is between 20 ms to 150 ms; and
wherein the second duration is between 180 ms to 700 ms.

7. The torque sensor of claim 1,
wherein the first direction is opposite to the second direction.

8. The torque sensor of claim 1,
wherein the second current pulse is introduced into the sensor element at the second location at the circumferential surface such that there is the second current flow in the second direction in the core region of the sensor element; and
wherein the second current pulse is discharged from the sensor element at the first location at the circumferential surface.

9. The torque sensor of claim 1,
wherein the sensor element is a shaft;
wherein the core region extends inside the shaft along its longitudinal extension such that the core region surrounds a center of the shaft;
wherein the circumferential surface is the outside surface of the shaft; and
wherein the first and second locations are respective circumferential regions at the outside of the shaft.

10. The torque sensor of claim 1,
wherein the first current pulse has a first maximum between 40 and 1400 Ampere.

11. The torque sensor of claim 10,
wherein a second maximum of the second pulse essentially corresponds to the first maximum.

12. The torque sensor of claim 1,
wherein the first current pulse has a first maximum between 60 and 800 Ampere.

13. The torque sensor of claim 1,
wherein the first current pulse has a first maximum between 75 and 600 Ampere.

14. The torque sensor of claim 1.
wherein the first current pulse has a first maximum between 80 and 500 Ampere.

15. The torque sensor of claim 1,
wherein the sensor element is made of steel.

16. The torque sensor of claim 15,
wherein the steel includes nickel.

17. The torque sensor of claim 1,
wherein at least one of the first current pulse and at least one of the second current pulse are applied to the sensor element such that the sensor element has a magnetically encoded region;
wherein, in a direction essentially perpendicular to a surface of the sensor element, the magnetically encoded region of the sensor element has a magnetic field structure such that there is a first magnetic flow in a first direction and a second magnetic flow in a second direction; and
wherein the first direction is opposite to the second direction.

18. The torque sensor of claim 1,
wherein in a cross-sectional view of the sensor element, there is a first circular magnetic flow having the first direction and a first radius and a second circular magnetic flow having the second direction and a second radius; and
wherein the first radius is larger than the second radius.

19. The torque sensor of claim 1,
wherein the sensor element has a first pinning zone adjacent to the first location and a second pinning zone adjacent to the second location.

20. The torque sensor of claim 19,
wherein, for forming a first pinning zone, one of at the first location and adjacent to the first location, a third current pulse is applied on the circumferential surface to the sensor element such that there is a third current flow in the second direction; and wherein the third current flow is discharged at a third location which is displaced from the first location in the second direction.

21. The torque sensor of claim 19,
wherein, for forming a second pinning zone, one of at the second location and adjacent to the second location, a fourth current pulse is applied on the circumferential surface to the sensor element such that there is a fourth current flow in the first direction; and
wherein the fourth current flow is discharged at a forth location which is displaced from the second location in the first direction.

22. A torque sensor, comprising:
a first sensor element with a magnetically encoded region, the first sensor element having a surface,
wherein, in a direction essentially perpendicular to the surface of the first sensor element, the magnetically encoded region of the first sensor element has a magnetic field structure such that there is a first magnetic flow in a first direction and a second magnetic flow in a second direction, the first direction being opposite to the second direction:
wherein the first sensor element has variations in a material of the first sensor element caused by one of at least one current pulse and surge applied to the first sensor element for altering the magnetically encoded region
wherein in a cross-sectional view of the first sensor element, there is a first circular magnetic flow having the first direction and a first radius and a second circular magnetic flow having the second direction and a second radius, the first radius being larger than the second radius.

23. The torque sensor of claim 19, further comprising:
a second sensor element with at least one magnetic field detector, the second sensor element detecting variations in the magnetically encoded region.

24. The torque sensor of claim 22,
wherein the magnetically encoded region extends longitudinally along a section of the first sensor element, but does not extend from one end face of the first sensor element to the other end face of the first sensor element.

25. The torque sensor of claim 24,
wherein the variations are at an outer surface of the sensor element and not at the end faces of the first sensor element.

26. The torque sensor of claim 22,
wherein the first sensor element is made of steel.

27. The torque sensor of claim 26,
wherein the steel includes nickel.

28. The torque sensor of claim 22,
wherein the magnetically encoded region of the first sensor element has first pinning regions adjacent to end regions of the magnetically encoded region.

29. The torque sensor of claim 22,
wherein the first sensor clement is a shaft.

30. A method for magnetically encoding a sensor element for a torque sensor, comprising:
applying a first current pulse to sensor in such a manner that there is a first current flow in a first direction along a longitudinal axis of the sensor element, wherein the first current pulse is such that the application of the current pulse generates a magnetically encoded region in the sensor element; and
applying a second current pulse to the sensor element;
wherein the second current pulse is applied such that there is a second current flow in a second direction along the longitudinal axis of the sensor element, wherein each of the first and second current pulses has a raising edge and a falling edge, the raising edge being steeper than the falling edge.

31. The method of claim 30,
wherein the first current pulse has a first maximum between one of 40 and 1400 Ampere; 60 and 800 Ampere; 75 and 600 Ampere; and 80 and 500 Ampere.

32. The method of claim 31,
wherein a second maximum of the second pulse essentially corresponds to the first maximum.

33. The method of claim 30,
wherein a first duration of the first current pulse is longer than a second duration of the second current pulse.

34. The method of claim 33,
wherein one of(l) the first duration is smaller than 300 ms and the second duration is larger than 300 ms; (ii) the first duration is smaller than 200 ms and the second duration is larger than 400 ms; and (iii) the first duration is between 20 to 150 ms and the second duration is between 180 to 700ms.

35. The method of claim 30,
wherein the first current pulse is applied using an electrode system having at least a first electrode and a second electrode; and
wherein the first electrode is located at the first location and the second electrode is located at the second location.

36. The method of claim 35,
wherein each of the first electrodes has a plurality of electrode pins; and
wherein the plurality of electrode pins of each of the first and second electrodes are arranged in circumferentially around the sensor element such that the sensor element is contacted by the electrode pins of the first and second electrodes at a plurality of contact points at an outer circumferential surface of the shaft at the first and second locations.

37. The method of claim 30,
wherein at least one of the first current pulse and at least one of the second current pulse are applied to the sensor element such that the sensor element has a magnetically encoded region;
wherein, in a direction essentially perpendicular to a surface of the sensor element, the magnetically encoded region of the sensor element has a magnetic field structure such that there is a first magnetic flow in a first direction and a second magnetic flow in a second direction; and
wherein the first direction is opposite to the second direction.

38. A method for magnetically encoding a sensor element for a torque sensor, comprising:
applying a first current pulse to sensor element;
wherein the first current pulse is applied in such a manner that there is a first current flow in a first direction along a longitudinal axis of the sensor element ; and
wherein the first current pulse is such that the application of the current pulse generates a magnetically encoded region in the sensor element,
applying a second current pulse to the sensor element;
wherein the second current pulse is applied such that there is a second current flow in a second direction along the longitudinal axis of the sensor element,
wherein the first direction is opposite to the second direction.

39. A method for magnetically encoding a sensor element for a torque sensor, comprising:
applying a first current pulse to sensor element;
wherein the first current pulse is applied in such a manner that there is a first current flow in a first direction along a longitudinal axis of the sensor element; and wherein the first current pulse is such that the application of the current pulse generates a magnetically encoded region in the sensor element, wherein the sensor element has a circumferential surface surrounding a core region of the sensor element;

wherein the first current pulse is introduced into the sensor element at a first location at the circumferential surface such that there is the first current flow in the first direction in the core region of the sensor element;

wherein the first current pulse is discharged from the sensor element at a second location at the circumferential surface; and wherein the second location is at a distance in the first direction from the first location.

40. The method of claim 39, wherein the second current pulse is introduced into the sensor element at the second location at the circumferential surface such that there is the second current flow in the second direction in the core region of the sensor element; and wherein the second current pulse is discharged from the sensor element at the first location at the circumferential surface.

41. The method of claim 39, wherein the sensor element is a shaft;

wherein the core region extends inside the shaft along its longitudinal extension such that the core region surrounds a center of the shaft;

wherein the circumferential surface is the outside surface of the shaft;

wherein the first and second locations are respective circumferential regions at the outside of the shaft.

42. The method of claim 39, further comprising:

providing a first pinning zone adjacent to the first location and a second pinning zone adjacent to the second location.

43. The method of claim 42, further comprising:

forming the first pinning zone by applying a third current pulse to the circumferential surface of the sensor element one of at the first location and adjacent to the first location, such that there is a third current flow in the second direction;

wherein the third current flow is discharged at a third location which is displaced from the first location in the second direction.

44. The method of claim 43, further comprising:

forming the second pinning zone, one of at the second location and adjacent to the second location, by applying a forth current pulse on the circumferential surface to the sensor element such that there is a forth current flow in the first direction;

wherein the forth current flow is discharged at a forth location which is displaced from the second location in the first direction.

* * * * *